United States Patent
Pathak et al.

(10) Patent No.: US 12,547,608 B1
(45) Date of Patent: Feb. 10, 2026

(54) ANOMALY DETECTION IN DATA

(71) Applicant: Honeywell International Inc., Charlotte, NC (US)

(72) Inventors: Ambarish Pathak, Mirzapur (IN); Amit Gautam, Dublin (IE)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/887,049

(22) Filed: Sep. 17, 2024

(51) Int. Cl.
  *G06F 7/00* (2006.01)
  *G06F 16/23* (2019.01)
  *G06F 16/28* (2019.01)

(52) U.S. Cl.
  CPC ........ *G06F 16/2365* (2019.01); *G06F 16/285* (2019.01)

(58) Field of Classification Search
  CPC .......................... G06F 16/2365; G06F 16/285
  USPC .................................................. 707/600–899
  See application file for complete search history.

(56) References Cited

U.S. PATENT DOCUMENTS

| | | | | |
|---|---|---|---|---|
| 2015/0199224 | A1* | 7/2015 | Mihnev | G06F 11/0709 714/37 |
| 2018/0109531 | A1* | 4/2018 | Urmanov | H04L 63/0227 |

* cited by examiner

*Primary Examiner* — Isaac M Woo
(74) *Attorney, Agent, or Firm* — Schwegman Lundberg & Woessner, P.A.

(57) ABSTRACT

Techniques for anomaly detection in data are disclosed. A first plurality of data points that are connected to each other are partitioned into a first plurality of clusters and a corresponding functional form is determined. A second plurality of data points is compared with a threshold number. A data point of the second plurality of data points is identified as an anomaly based on a margin of error if the second plurality of data points is lesser than the threshold number or a functional form of the first plurality of clusters and functional form of the second plurality of clusters if the second plurality of data points is not lesser than the threshold number. A signal corresponding to the data point is generated indicating that the data point is an anomaly.

20 Claims, 12 Drawing Sheets

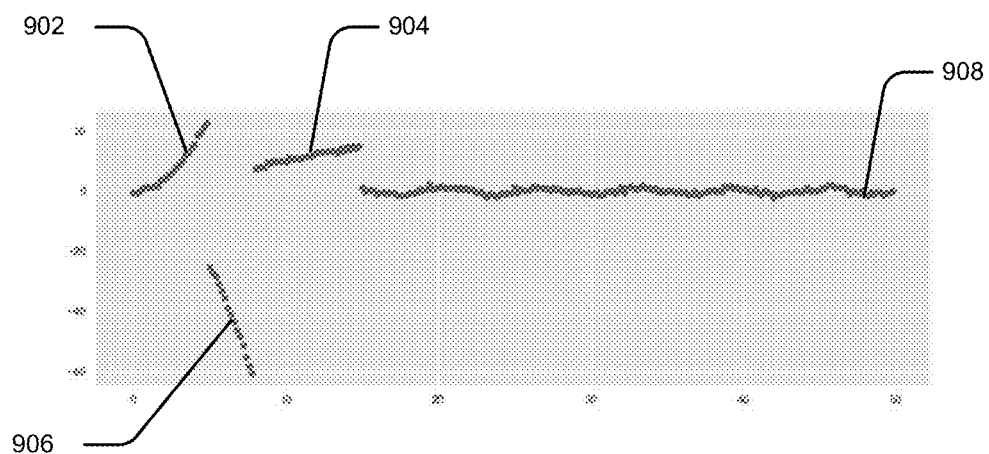
Fig. 9a
Fig. 9b
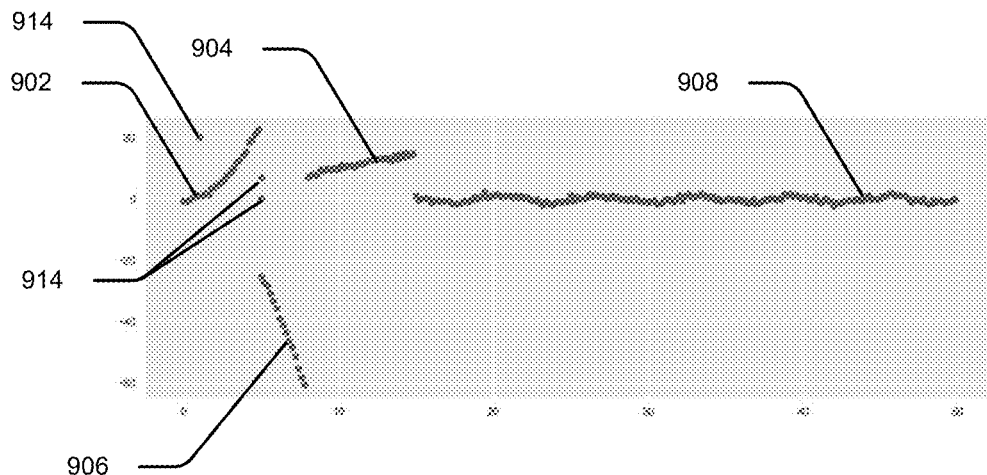
Fig. 9c

ANOMALY DETECTION IN DATA

BACKGROUND

Generally, many organizations, such as industries, business groups, and the like, perform data analysis for various purposes. For instance, an organization may have different sub-groups. The budget, the profits, and the expenditure of each sub-group for various time periods may have to be analyzed for providing insights, such as for increasing the budget for one sub-group and reducing the budget for another sub-group for the subsequent time period. As an example, in an industrial plant, data corresponding to a manufacturing equipment, such as an injection moulding machine, may have to be analyzed to understand insights corresponding to the manufacturing equipment.

In some scenarios, the data may have an anomaly that may correspond to unusual, aberrant, or unexpected data points occurring in the data. The anomaly may be indicative of a problem in the data and thereby, problem in the corresponding system that produced the data. Based on determination of the anomaly in the data, causes for the anomaly in the data may be identified to address the problem in the system. For instance, assume that there are 12 data points corresponding to a profit data for a business sub-group. Out of the 12 data points, assume that two data points are identified as anomalies. In this regard, the data corresponding to the two data points, such as budget allocated corresponding to the two data points, expenditure made corresponding to the two data points, and the like, may be further analyzed to identify the cause of the anomalies and to understand the anomaly in profit for the business sub-group.

SUMMARY

In the present subject matter, a system for anomaly detection in data may include a processing unit. The processing unit may receive a first data including a first plurality of data points. The processing unit may identify data points from the first plurality of data points that are connected to each other. The data points that are connected to each other may be identified using a first model. The first model may be a Density-Based Spatial Clustering of Applications with Noise (DB-SCAN) model. The processing unit may form, using the first model, a first plurality of clusters based on the identification, wherein each of the first plurality of clusters correspond to the data points of the first plurality of data points that are connected with each other. In an example, the processing unit may determine a functional form for each of the first plurality of clusters in response to the forming of the first plurality of clusters. The functional form of a cluster is indicative of property of the cluster. The functional form of the first plurality of clusters indicates one of: linear relation and a non-linear relationship between at least two variables corresponding to the first plurality of data points. The functional form may be determined using one of: a regression model, a decision tree model, a random forest model, and an Artificial Neural Network model.

The processing unit may receive a second data including a second plurality of data points, where an anomaly in the second data is to be detected. The processing unit may compare the second plurality of data points with a threshold number of data points. The processing unit may detect a margin of error for each data point of the second plurality of data points relative to the functional forms of each of the first plurality of clusters based on ascertaining that the second plurality of data points is lesser than the threshold number of data points. The processing unit may determine a functional form for each of a second plurality of clusters in response to ascertaining that the second plurality of data points is not lesser than the threshold number of data points. Each of the second plurality of clusters may correspond to data points from the second plurality of data points that are connected to each other. The functional form of a cluster of the second plurality of clusters is indicative of property of the cluster. The functional form of the second plurality of clusters indicates one of: linear relation and a non-linear relationship between at least two variables corresponding to the second plurality of data points. The processing unit may identify if a data point of the second plurality of data points is an anomaly based on the detected margin of error or the determined functional forms for the first plurality of clusters and the determined functional forms for the second plurality of clusters. The processing unit may generate, in response to the identification, a signal corresponding to the data point. The signal may indicate that the data point is an anomaly.

In an example, a method for anomaly detection in data may include partitioning, using a DB-SCAN model, a first data comprising a first plurality of data points in a multi-dimensional space into a first plurality of clusters. Each of the first plurality of clusters may include a subset of the first plurality of data points that are densely connected to each other. The partitioning may include determining an optimal number for the first plurality of clusters. A functional form may be derived for each of the first plurality of clusters. The functional form of a cluster of the first plurality of clusters represents dependencies between at least two variables corresponding to the cluster. A second data including a second plurality of data points may be received. The second plurality of data points may be compared with a threshold number of data points. Further, the method may include partitioning, using the DB-SCAN model, the second plurality of data points in the multi-dimensional space into a second plurality of clusters based on the comparison. Each of the second plurality of clusters may include a subset of the second plurality of data points that are densely connected to each other. The partitioning may include determining an optimal number for the second plurality of clusters. A link strength for each of the second plurality of clusters relative to each of the first plurality of clusters may be determined. The link strength may be indicative of number of data points of a cluster of the second plurality of clusters that are common with data points of a cluster of the first plurality of clusters. A functional form for each of the second plurality of clusters may be derived in response to the determination of the link strength. The functional form of a cluster of the second plurality of clusters may represent dependencies between at least two variables corresponding to the cluster. In an example, the method may include deriving the functional forms for the first plurality of clusters and functional forms for the second plurality of clusters using one of: regression model, a decision tree model, a random forest model, and an Artificial Neural Network model. An anomaly in the second plurality of data points may be identified upon the deriving of the functional form corresponding to each of the second plurality of clusters. The method may include generating, in response to the identification of a data point of the second plurality of data points as the anomaly, a signal corresponding to the data point, the signal indicating that the data point is an anomaly.

In an example, a non-transitory computer-readable medium may include instructions for anomaly detection in data. The instructions may be executable by a processing resource to receive a first data comprising a first plurality of data points and partition, using a first model, the first data into a first plurality of clusters. Each of the first plurality of clusters may include a subset of the first plurality of data points that are densely connected to each other. A functional form for each of the first plurality of clusters may be derived. The functional form of a cluster of the first plurality of clusters may be indicative of property of the cluster. The instructions may be executable by the processing resource to receive a second data comprising a second plurality of data points and to compare the second plurality of data points with a threshold number of data points. The instructions may be executable by the processing resource to ascertain that the second plurality of data points is not lesser than threshold number of data points and to partition, using the first model, the second plurality of data points into a second plurality of clusters in response to ascertaining that the second plurality of data points is not lesser than the threshold number of data points. Each of the second plurality of clusters may include a subset of the second plurality of data points that are densely connected to each other. A link strength for each of the second plurality of clusters relative to each of the first plurality of clusters may be determined. The link strength may be indicative of number of data points of a cluster of the second plurality of clusters that are common with data points of a cluster of the first plurality of clusters.

The instructions may be executable by the processing resource to derive a functional form of a cluster of the second plurality of clusters in response to determination the link strength for the cluster of the second plurality of clusters relative to a cluster of the first plurality of clusters being weak and/or a merged functional form for the cluster of the second plurality of clusters in response to the determination that the link strength for the cluster of the second plurality of clusters relative to a cluster of the first plurality of clusters being strong. The functional form of the cluster of the second plurality of clusters may be indicative of property of the cluster and the merged functional form is a functional form corresponding to a merged cluster obtained by merging of the cluster of the second plurality of clusters with the cluster of the first plurality of clusters. The merged functional form is indicative of property of the merged cluster. The instructions may be executable by the processing resource to identify if a data point of the second plurality of data points is an anomaly based on the deriving of the at least one of the functional form and the merged functional form and generate, in response to the identification, a signal corresponding to the data point, the signal indicating that the data point is an anomaly.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 9a illustrates an example of densely connected clusters, in accordance with example implementation of present subject matter.

FIG. 9b illustrates an example table of different frequencies obtained for different pair of values of Epsilon (ε), min_samples, cluster count, and prediction variance, in accordance with example implementation of present subject matter.

FIG. 9c illustrates an example of additional data points obtained along with the densely connected clusters, in accordance with example implementation of present subject matter.

DETAILED DESCRIPTION

Figure 1:
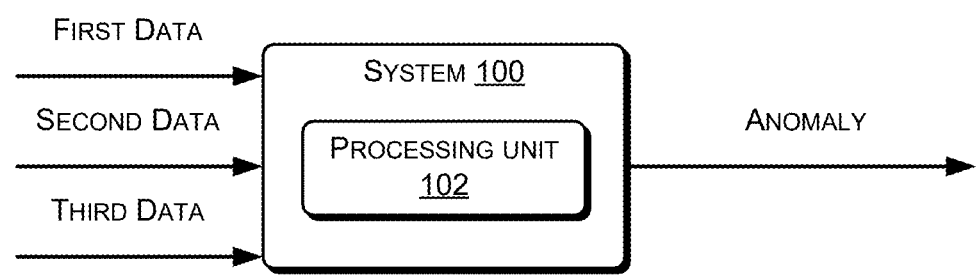
FIG. 1 illustrates a system for anomaly detection in data, according to an example implementation of the present subject matter.

Many a time, organizations may perform analysis of data for various purposes. The data may have anomalies that may correspond to unusual, aberrant, or unexpected data points occurring in the data. The anomalies in the data may serve as an indication of an issue that may be present in the system. Early identification of the anomalies in the data allows for early identification and early addressing of the issues corresponding to the system.

Conventionally, techniques for anomaly detection in data focus on identifying data points that deviate significantly from expected patterns or distributions. For instance, assume that the operating efficiency of an injection moulding machine for a particular type of molten material taken at every hour for a twelve-hour time period is obtained. Further assume that the operating efficiency for 10 one-hour readings is 95% but the operating efficiency for 2 one-hour readings is 90%. In this regard, since the two one-hour readings value of 90% is significantly deviating from the other one-hour readings of 90%, the two one-hour readings may be determined as anomalous values.

Typically, the techniques for identifying anomalous values or outliers rely on statistical techniques, density-based methods, clustering methods, machine learning methods, and the like. As an example of the statistical techniques, statistical distributions or patterns are identified. Based on the statistical distributions or patterns, normal data and threshold are identified. The data points that are falling outside the threshold are identified as anomalous data points. In the density-based methods, data points that are in a high-density region are identified as normal data points and data points in a low-density region are identified as anomalous data points. In the clustering methods, data points are grouped into different clusters and the data point not fitting into any of the clusters are considered anomalies. In the machine learning methods, anomalies are identified in data based on a model that is built using a training dataset. The training dataset includes normal and anomalous data points.

However, conventional techniques do not accurately capture the anomaly in the data. For instance, if the data point is even slightly displaced at a distance from the normal data points, the data point may be identified as an anomaly. However, such identification of anomalous data may not be accurate. There may be a scenario where extreme values for each dimension corresponding to the data point may not have been accounted yet with the relationship among dimensions that the data points already preserve. There may be a possibility of a new relationship among the variables corresponding to the data points supported by sufficient data points with higher average distance from the existing data points. Accordingly, the conventional techniques may either falsely identify data points as anomalies or may miss anomalies as data patterns evolve over time.

Conventional techniques treat anomaly detection as a binary classification problem, i.e., a data point is either normal or anomalous. Such simplification can lead to false positives or false negatives. For instance, when new and valid relationships among variables emerge in the data, use of conventional techniques may result in false positives. Similarly, in some scenarios, when subtle anomalies exist within otherwise normal-looking subset of the data points, use of conventional techniques may result in false negatives.

In this regard, conventional anomaly detection techniques often struggle to accurately identify anomalies in scenarios where relationships between variables can be dynamic and non-linear. Accordingly, the conventional anomaly detection techniques cannot accurately identify anomalous data in complex, high-dimensional datasets. Further, the conventional anomaly detection techniques cannot adapt criterion to detect anomaly when new data evolves.

The present subject matter facilitates anomaly detection in data. With the present subject matter, anomalies in data can be detected accurately. Particularly, the present subject matter may enable accurate detection of anomalies even with dynamic, multi-dimensional datasets, and non-linear data. The present subject matter also offers insights into evolving data patterns and relationship between different variables corresponding to the data.

In an example, the present subject matter may relate to techniques for anomaly detection of data. A first data comprising a first set of data points may be received. Data points of the first plurality of data points that are densely connected together may be identified using a first model. The first model may be, for example, a density-based clustering model. Particularly, the first model may be, for example, a Density-Based Spatial Clustering of Applications with Noise (DB-SCAN) model. Each set of connected data points may be partitioned as a cluster using the DB-SCAN model. Accordingly, the techniques may include partitioning the first plurality of data points into a first plurality of clusters. In an example, the techniques include determining an optimal number for the first plurality of clusters. The partitioning may correspond to partitioning in a multi-dimensional space, where a data point corresponds to relationship between more than two variables.

Subsequently, a functional form for each of the first plurality of clusters may be determined in response to the forming of the first plurality of clusters. The functional form of a cluster is indicative of the property of the cluster and represents dependencies between at least two variables corresponding to the cluster. The dependency may be, for example, a linear dependency or a non-linear dependency. In an example, the functional form for each of the first plurality of clusters may be determined using a regression model, a decision tree model, a random forest model, or an Artificial Neural Network model.

Further, a second data comprising a second plurality of data points may be received. In an example, the anomaly in the second data may have to be detected. To detect the anomaly, in an example, the second plurality of data points may be compared with a threshold number of data points. In an example, it may be ascertained If the second plurality of data points is lesser than the threshold number of data points based on the comparison. The second plurality of data points being lesser than the threshold number of data points is indicative of lesser number of data points. In this regard, a margin of error corresponding to each of the second plurality of data points relative to the functional form for each of the first plurality of clusters may be detected. This may be performed based on the ascertaining that the second plurality of data points is lesser than the threshold number of data points. If the margin of error is greater than a threshold, then data point may be identified as an anomaly. In other words, if the data point of the second plurality of data points does not satisfy the functional form of each of the first plurality of data points, then the data point may be identified as an anomaly. In response to the identification, a signal may be generated. The signal may be indicative that the data point is an anomaly.

In another example, based on the comparison of the second plurality of data points with the threshold number of data points, it may be ascertained that the second plurality of data points is not lesser than the threshold number of data points. In other words, the second plurality of data points being not lesser than the threshold number of data points is indicative of a higher number of data points. Data points of the second plurality of data points that are densely connected together may be identified using the first model. Each set of connected data points may be partitioned as a cluster using the DB-SCAN model. Accordingly, the techniques may include partitioning the second plurality of data points into a second plurality of clusters. In an example, the techniques include determining an optimal number for the second plurality of clusters. The partitioning may correspond to partitioning in a multi-dimensional space, where a data point corresponds to relationship between more than two variables.

Further, a link strength for each of the second plurality of clusters relative to each of the first plurality of clusters may be determined. The link strength may be indicative of number of data points of a cluster of the second plurality of clusters that are common with data points of a cluster of the first plurality of clusters. In addition, the link strength may also be indicative of common data points with a hyperspace of a predetermined radius. In an example, it may be determined whether the link strength is weak.

To determine if the link strength is weak, the link strength for each of the second plurality of clusters relative to the first plurality of clusters may be compared with a threshold number of common data points. If the link strength is lesser than the threshold number of common points, it may be established that the link strength of a cluster of the second plurality of clusters relative to the first plurality of clusters is weak.

If the link strength is determined to be weak, a functional form for each of the second plurality of clusters may be determined. The functional form is indicative of the property of a cluster of the second plurality of clusters and represents dependencies between at least two variables corresponding to the cluster. The dependency may be, for example, a linear dependency or a non-linear dependency. In an example, the functional form for each of the second plurality of clusters may be determined using a regression model, a decision tree model, a random forest model, or an Artificial Neural Network model.

If a data point of the second plurality of data points does not align with the functional forms of the first plurality of clusters or the functional forms of the second plurality of clusters, the data point may be identified as an anomaly. In other words, if a data point does not satisfy the functional forms of the first plurality of clusters or the functional forms of the second plurality of clusters, the data point may be identified as an anomaly. In response to the identification, a signal may be generated. The signal may be indicative that the data point is an anomaly.

In an example, upon determining the link strength, it may be determined if the link strength is strong. To determine if the link strength is strong, the link strength for each of the second plurality of clusters relative to the first plurality of clusters may be compared with a threshold number of common data points. If the link strength is not lesser than the threshold number of common data points, it may be established that the link strength of a cluster of the second plurality of clusters relative to the first plurality of clusters is strong.

If the link strength is determined to be strong, a merged cluster may be obtained by merging a cluster of the second plurality of clusters and a cluster of the first plurality of clusters (i.e., merging the cluster of the second plurality of clusters whose link strength with a cluster of the first plurality of clusters is strong). Subsequently, a functional form for the merged cluster (also referred to as the merged functional form) may be determined. The merged functional form may be indicative of the property of the merged cluster and represents dependencies between at least two variables corresponding to the merged cluster. The dependency may be, for example, a linear dependency or a non-linear dependency. In an example, the functional form for the merged cluster may be determined using a regression model, a decision tree model, a random forest model, or an Artificial Neural Network model. In this regard, if a data point of the second plurality of data points does not align with the functional forms of the first plurality of clusters, the functional forms of the second plurality of clusters, or the merged functional form, the data point may be identified as an anomaly. In other words, if a data point does not satisfy the functional forms of the first plurality of clusters, the functional forms of the second plurality of clusters, or the merged functional form, the data point may be identified as an anomaly. In response to the identification, a signal may be generated. The signal may be indicative that the data point is an anomaly.

In addition, in some scenarios, the clusters may saturate and may no longer be updated at a future point in time. Accordingly, in the present subject matter, a saturation point for the functional forms may be identified and the anomaly detection may be performed based on the identified saturation point. For instance, a rate of expansion for each of the first plurality of clusters, the second plurality of clusters, and the merged cluster may be computed. A saturation point for the functional form for each of the first plurality of clusters, the second plurality of clusters, and the merged cluster may be determined based on the rate of expansion. Upon receiving an additional data point, it may be identified if the additional data point is an anomaly based on the determined functional forms of the first plurality of clusters, functional forms of the second plurality of clusters, the merged functional form, and based on the saturation points.

The present subject matter accurately detects the anomalies in data. The present subject matter enables classifying the data point as an anomaly per the functional form existing in a multi-dimensional space. With the use of the present subject matter, complex and non-linear relationships between variables in a multi-dimensional space may be identified and represented. Further, in the present subject matter, clusters are dynamically updated as new data patterns evolve. Accordingly, the present subject matter eliminates detection of false positives or false negatives corresponding to identification of anomaly in data and thereby, increasing the accuracy of detection of anomalies. Since the present subject matter uses functional forms for anomaly prediction, the present subject matter can be in forecasting a time series and removing the anomalies with proper substitute points to make the forecast precise. Further, since the present subject matter captures all possible functional forms in the data and identifies the anomaly in advance, classification of data at a future point of time is also possible. For example, if any data point at a current time is assumed an anomaly. As per future projection, the data point may not be an anomaly. The present subject matter enables accurately determining the future projection. Therefore, the present subject matter helps understanding the patterns in data in advance.

The present subject matter is further described with reference to FIGS. 1-9e. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 100 for anomaly detection in data, according to an example implementation of the present subject matter. The system 100 may detect anomaly in the data. The system 100 may be and/or may include a microprocessor, a microcomputer, a microcontroller, a digital signal processor, a central processing unit, a state machine, a logic circuitry, or a device that manipulates signals based on operational instructions. Among other capabilities, the system 100 may fetch and execute computer-readable instructions stored in a memory, such as a volatile memory or a non-volatile memory, of the system 100. The system 100 may include a device (not shown in FIG. 1), such as a display device, for displaying data and anomaly detected in data. The system 100 may include a processing unit 102 to perform anomaly detection in data.

In an example, the data may comprise a set of data points. The data points may correspond to a linear or a non-linear relationship in a multi-dimensional space. In other words, each data point may correspond to a linear or a non-linear relationship of at least two variables. For instance, assume that data corresponds to profit data of a business sub-group. Each data point may correspond to a linear relationship between budget of the business sub-group and expenditure of the business sub-group. In the example depicted herein, three data, such as a first data, a second data, and a third data, are shown. The first data may include a first plurality of data points. The second data may include a second plurality of data points. The third data may include at least one data point. The first data, the second data, and the third data may correspond to the same type of data. Further, the first data, the second data, and the third data may correspond to different batches of data. In an example, different batches correspond to different time frames. For instance, the first data may correspond to a first time frame. The second data may correspond to a second time frame. Similarly, the third data may correspond to a third time frame. In another example, different batches may correspond to the same time frame but of different entities. For instance, the first data may correspond to a first entity, the second data may correspond to a second entity, and the third data may correspond to a third entity. For example, the first entity may be a first sub-group of a business, the second entity may be a second sub-group of a business, and the third entity may correspond to a third sub-group of a business. In an example, the detection of anomaly may be performed with respect to the second data and the third data. The detection of anomaly in the data may be explained as follows.

In operation, the system 100 may receive the first data. The first data may include the first plurality of data points may be received. The system 100 may identify densely connected data points of the first plurality of data points. The system 100 may use a first model for the identification. The first model may be, for example, a density-based clustering model. In particular, the first model may be, for example, a Density-Based Spatial Clustering of Applications with Noise (DB-SCAN) model. The system 100 may partition each set of connected data points as a cluster using the DB-SCAN model. Accordingly, the system 100 may partition the first plurality of data points into a first plurality of clusters. For instance, assume that there are 100 data points in the first data. Further, assume that there are five sets of 20 data points each that are densely connected. The system 100 may partition using the DB-SCAN model the five set of 20 data points each into five clusters respectively. In an example, the system 100 may include determining an optimal number for the first plurality of clusters. For instance, the system 100 may identify number of clusters that are optimal using the first model. In other words, the system 100 may identify that 5 number of clusters are optimal number using the first model.

Further, the system 100 may derive a functional form for each of the first plurality of clusters in response to forming the first plurality of clusters. The functional form of a cluster is indicative of the property of the cluster and represents dependencies between at least two variables corresponding to the cluster. The dependency may be, for example, a linear dependency or a non-linear dependency. In an example, the functional form for each of the first plurality of clusters may be determined using a regression model, a decision tree model, a random forest model, or an Artificial Neural Network model. For instance, the system 100 may derive a function form for each of the 5 clusters.

The system 100 may receive a second data. The second data may include a second plurality of data points. In an example, the anomaly in the second data may have to be detected. The system 100 may compare the second plurality of data points with a threshold number of data points. Further, the system 100 may detect the anomaly based on the second plurality of data points. In an example, the system 100 may ascertain if the second plurality of data points is lesser than the threshold number of data points based on the comparison. The second plurality of data points being lesser than the threshold number of data points may be indicative of lesser number of data points. In this regard, the system 100 may detect margin of error corresponding to each of the second plurality of data points relative to the functional form for each of the first plurality of clusters. This may be performed based on the ascertaining that the second plurality of data points is lesser than the threshold number of data points. For instance, assume that the threshold number of data points is 20 and the second plurality of data points is 15. In this regard, the system 100 may detect a margin of error corresponding to each of the 15 data points relative to function of each of the 5 clusters. Particularly, the system 100 may identify the cluster of the first plurality of clusters in whose sub-space the data point of the second plurality of data points is present and the system 100 may detect the margin of error of a data point of the second plurality of data points relative to the function form of the cluster of the first plurality of cluster in whose sub-space the data point is present. For instance, assume that a data point "p" is in a sub-space of a first cluster. In this regard, the system 100 may detect margin of error of the data point "p" relative to the functional form of the first cluster. In an example, if the margin of error is greater than a threshold, then data point may be identified as an anomaly. In response to the identification, a signal may be generated. The signal may be indicative that the data point is an anomaly.

In another example, based on the comparison of the second plurality of data points with the threshold number of data points, the system 100 may ascertain that the second plurality of data points is not lesser than the threshold number of data points. In other words, the second plurality of data points being not lesser than the threshold number of data points is indicative of a higher number of data points. For instance, assume that the threshold number of data points is 25 and the second plurality of data points is 100. The system 100 may identify that the second plurality of data points is higher than the threshold number of data points. In this regard, the system 100 may identify data points of the second plurality of data points that are densely connected together. The identification may be performed using the first model. Each set of connected data points may be partitioned as a cluster using the DB-SCAN model. Accordingly, the system 100 may include partitioning the second plurality of data points into a second plurality of clusters. For instance, assume that the system 100 has identified 5 set of densely connected data points. Accordingly, the system 100 may partition the second data into 5 clusters. In an example, the system 100 may include determining an optimal number for the second plurality of clusters. The partitioning may correspond to partitioning in multidimensional scenario, where a data point corresponds to relationship between more than two variables.

Further, the system 100 may determine a link strength for each of the second plurality of clusters relative to each of the first plurality of clusters. The link strength may be indicative of number of data points of a cluster of the second plurality of clusters that are common with data points of a cluster of the first plurality of clusters. In addition, the link strength may also be indicative of common data points with a hypersphere of a predetermined radius.

In an example, based on the determination of the link strength being strong or weak, the system 100 may update existing functional forms or derive new functional forms. To determine if the link strength is weak, the system 100 may compare a link strength for each of the second plurality of clusters relative to the first plurality of clusters with a threshold number of common data points. If the link strength is lesser than the threshold number of common points, the system 100 may establish that the link strength of a cluster of the second plurality of clusters relative to the first plurality of clusters is weak.

If the link strength is determined to be weak, the system 100 may determine a functional form for each of the second plurality of clusters. The functional form is indicative of the property of a cluster of the second plurality of clusters and represents dependencies between at least two variables corresponding to the cluster. The dependency may be, for example, a linear dependency or a non-linear dependency. In an example, the functional form for each of the second plurality of clusters may be determined using a regression model, a decision tree model, a random forest model, or an Artificial Neural Network model.

If a data point of the second plurality of data points does not align with the functional forms of the first plurality of clusters or the functional forms of the second plurality of clusters, the data point may be identified as an anomaly. In other words, if a data point does not satisfy the functional forms of the first plurality of clusters or the functional forms of the second plurality of clusters, the data point may be identified as an anomaly. In response to the identification, a signal may be generated. The signal may be indicative that the data point is an anomaly.

In an example, upon determining the link strength, the system 100 may determine if the link strength is strong. To determine if the link strength is strong, the system 100 may compare the link strength for each of the second plurality of clusters relative to the first plurality of clusters with the threshold number of common data points. If the link strength is not lesser than the threshold number of common data points, the system 100 may establish that the link strength of a cluster of the second plurality of clusters relative to the first plurality of clusters is strong.

If the link strength is determined to be strong, the system 100 may obtain a merged cluster. The merged cluster may be obtained by merging a cluster of the second plurality of clusters and a cluster of the first plurality of clusters. In particular, the system 100 may identify a cluster of the first plurality of clusters with which the link strength of the cluster of the second plurality of clusters is strong. Subsequently, the system 100 may merge the cluster of the second plurality of clusters whose link strength with the cluster of the first plurality of clusters is strong. Further, the system 100 may derive a functional form for the merged cluster (also referred to as the merged functional form). The merged functional form may be indicative of the property of the merged cluster and represents dependencies between at least two variables corresponding to the merged cluster. The dependency may be, for example, a linear dependency or a non-linear dependency. In an example, the functional form for the merged cluster may be determined using a regression model, a decision tree model, a random forest model, or an Artificial Neural Network model.

To detect an anomaly, the system 100 may perform the following. If a data point of the second plurality of data points does not align with the functional forms of the first plurality of clusters, the functional forms of the second plurality of clusters, or the merged functional form, the data point may be identified as an anomaly. In other words, if a data point does not satisfy the functional forms of the first plurality of clusters, the functional forms of the second plurality of clusters, or the merged functional form, the data point may be identified as an anomaly. In response to the identification, a signal may be generated. The signal may be indicative that the data point is an anomaly.

In addition, in some scenarios, the clusters corresponding to the connected data points may saturate and may no longer be updateable at a future point in time. Accordingly, without identifying the saturation of the clusters, the detection of anomaly may not be accurate. For instance, a data point may satisfy the functional form of a cluster. However, the cluster may saturate without even reaching the data point. Therefore, classifying the data point as a normal data point and not an anomaly as the data point satisfies the function form may be an inaccurate classification.

In this regard, the system 100 may identify a saturation point for the functional forms and the system 100 may perform the anomaly detection based on the identified saturation point. For instance, the system 100 may compute a rate of expansion for each of the first plurality of clusters, the second plurality of clusters, and the merged cluster. The system 100 may determine a saturation point for the functional form for each of the first plurality of clusters, the second plurality of clusters, and the merged cluster based on the rate of expansion. The system 100 may receive the third data including at least one data point. The at least one data point may be explained with reference to a single data point and may be referred to hereinafter as the additional data point. Upon receiving the additional data point, the system 100 may identify if the additional data point is an anomaly based on the determined functional forms of the first plurality of clusters, functional forms of the second plurality of clusters, the merged functional form, and based on the saturation points.

Figure 2:
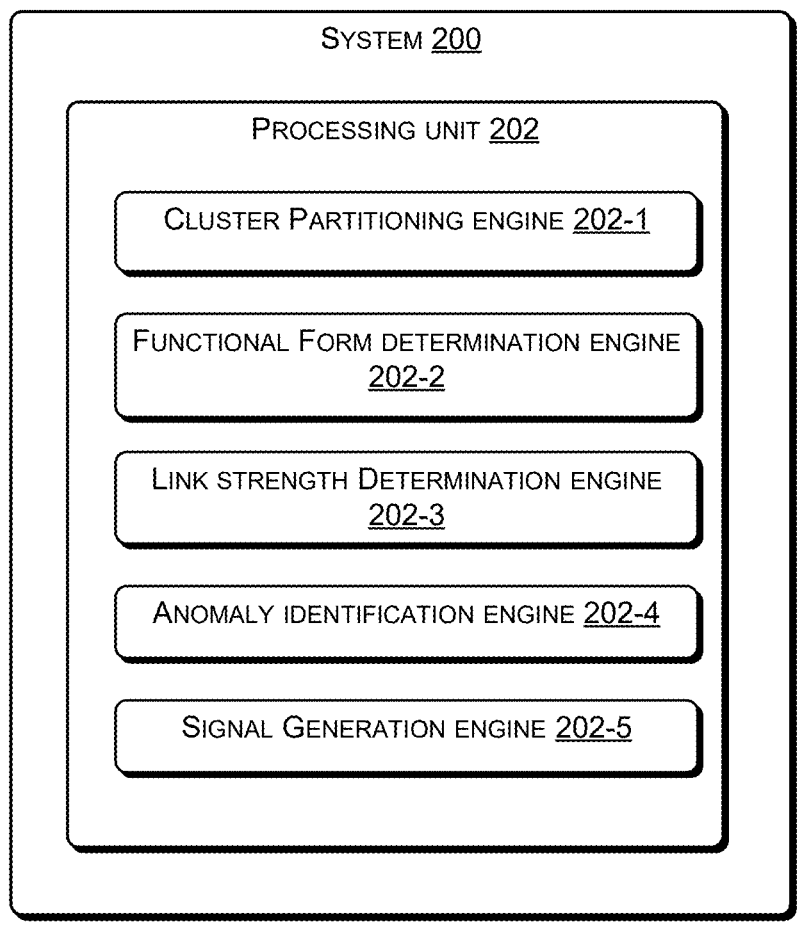
FIG. 2 illustrates a system for anomaly detection in data, according to an example implementation of the present subject matter.

FIG. 2 illustrates a system 200 for anomaly detection in data, according to an example implementation of the present subject matter. The system 200 may correspond to the system 100. The system 200 may be a computing device that has processing capabilities, such as a server, a desktop, a laptop, a tablet, a mobile phone, or the like. For instance, the system 200 may include a processing unit 202. The processing unit 202 may correspond to the processing unit 102. The processing unit 202 may be, for example, a microprocessor, a microcomputer, a microcontroller, a digital signal processor, a central processing unit, a state machine, a logic circuitry, or a device that manipulates signals based on operational instructions. Among other capabilities, the processing unit 202 may fetch and execute computer-readable instructions stored in a memory (not shown in FIG. 2), such as a volatile memory or a non-volatile memory, of the system 200. The processing unit 202 may run at least one operating system and other applications and services. The system 200 can also include an interface (not shown in FIG. 2) and a memory (not shown in FIG. 2).

The processing unit 202, amongst other capabilities, may be configured to fetch and execute computer-readable instructions stored in the memory. The processing unit 202 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit 202, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit 202, and the data. Further, the interface may enable the components of the system 200 to communicate with other cloud servers, web servers, and external repositories. The interface may facilitate multiple communications within a wide variety of networks and protocol types, including wired network, wireless networks, wireless Local Area Network (WLAN), RAN, satellite-based network, and the like.

The memory may be coupled to the processing unit 202 and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the system 200 may include one or more engines 202-1-202-5. The engines 202-1-202-5 may include routines, programs, objects, components, data structures, and the like, which perform particular tasks or implement particular abstract data types. Further, the engines 202-1-202-5 may be implemented in hardware, instructions executed by a processing unit, or by a combination thereof.

In an implementation, the engines 202-1-202-5 may be machine-readable instructions which, when executed by the processing unit 202, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 202-1-202-5 may perform different functionalities. The engines 202-1-202-5 may include a cluster partitioning engine 202-1, a functional form determination engine 202-2, a link strength determination engine 202-3, an anomaly identification engine 202-4, and a signal generation engine 202-5.

The cluster partitioning engine 202-1 may partition a first data into a first plurality of clusters and may partition a second data into a second plurality of clusters. In this regard, the cluster partitioning engine 202-1 may identify data points from the first plurality of data points that are connected to each other and form the first plurality of clusters based on the identification. Similarly, the cluster partitioning engine 202-1 may identify data points from the second plurality of data points that are connected to each other and form the second plurality of clusters based on the identification. In an example, for the partitioning, the cluster partitioning engine 202-1 may determine an optimal number for the first plurality of clusters and may determine an optimal number for the second plurality of clusters. The cluster partitioning engine 202-1 may use a first model for the partitioning of the first data and the second data. The first model may be, for example, a density based spatial clustering, such as a DB-SCAN model. In an example, the cluster partitioning engine 202-1 may form at least one merged cluster by merging at least one of the first plurality of clusters and at least one of the second plurality of clusters.

The functional form determination engine 202-2 may derive a functional form for each of the first plurality of clusters and a functional form for each of the second plurality of clusters. In an example, the functional form determination engine 202-2 may compare the second plurality of data points with a threshold number of data points and may perform actions based on the comparison. For instance, in an example, the functional form determination engine 202-2 may detect a margin of error for each data point of the second plurality of data points relative to the functional forms of each of the first plurality of clusters in response to ascertaining that the second plurality of data points is lesser than the threshold number of data points.

In another example, the functional form determination engine 202-2 may determine a functional form for each of a second plurality of clusters in response to ascertaining that the second plurality of data points is not lesser than the threshold number of data points. In a yet another example, the functional form determination engine 202-2 may derive a merged functional form for the at least one merged cluster.

The link strength determination engine 202-3 may determine a link strength for each of the second plurality of clusters relative to each of the second plurality of clusters in response to forming the second plurality of clusters. The link strength determination engine 202-3 may compare the link strength for each of the second plurality of clusters relative to each of the first plurality of clusters with a threshold number of common data points. Further, the link strength determination engine 202-3 may establish that the link strength of the cluster of the second plurality of clusters relative to the cluster of the first plurality of clusters is strong or weak based on the comparison.

The anomaly identification engine 202-4 may identify if a data point of the second plurality of data points is an anomaly based on the detected margin of error and/or the determined functional forms for the first plurality of clusters and the determined functional forms for the second plurality of clusters. For instance, the anomaly identification engine 202-4 may compare the detected margin of error with a threshold. Further, the anomaly identification engine 202-4 may identify that a data point is an anomaly if the detected margin of error is not lesser than the threshold. In another example, the anomaly identification engine 202-4 may identify if a data point of the second plurality of data points does not satisfy the functional form of the first plurality of clusters and the second plurality of clusters. In yet another example, the anomaly identification engine 202-4 may identify an anomaly in the second plurality of data points if a data point does not satisfy the functional form corresponding to each of the first plurality of clusters, functional form corresponding to each of the second plurality of clusters, or functional form of the at least one merged cluster.

Further, the anomaly identification engine 202-4 may compute a rate of expansion for each of the first plurality of clusters, the second plurality of clusters, and the merged cluster. The anomaly identification engine 202-4 may determine a saturation point for the functional form for each of the first of clusters, the second plurality of clusters, and the merged clusters based on the rate of expansion. The anomaly identification engine 202-4 may identify if an additional data point is an anomaly based on the determined corresponding to each of the first plurality of clusters, functional form corresponding to each of the second plurality of clusters, or functional form of the at least one merged cluster and based on the saturation points. The signal generation engine 202-5 may generate a signal indicating that a data point is an anomaly in response to the identification of the data point as the anomaly.

Figure 3:
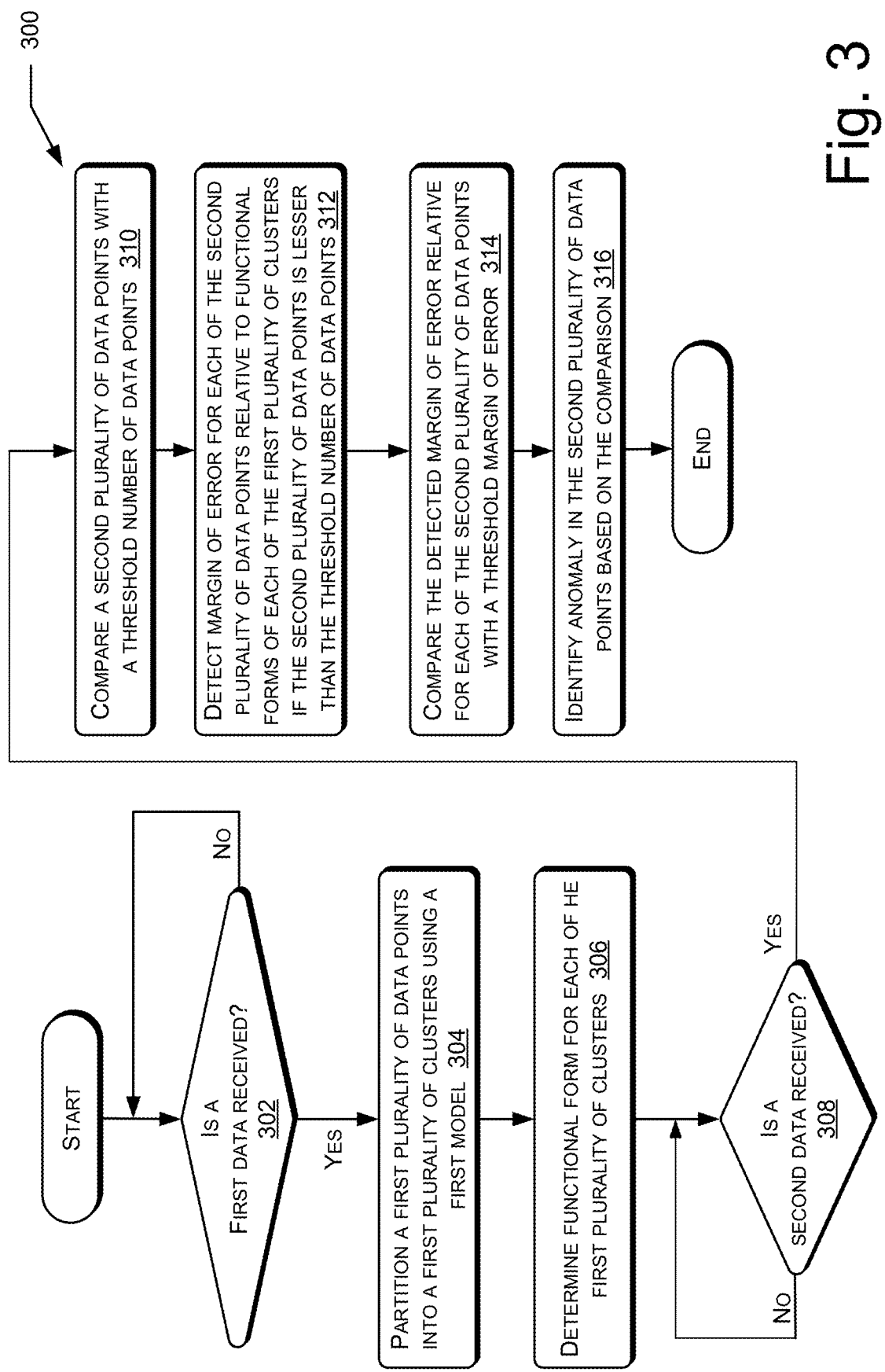
FIG. 3 illustrates a method for anomaly detection in data, according to an example implementation of the present subject matter.

FIG. 3 illustrates a method 300 for anomaly detection in data, according to an example implementation of the present subject matter. The order in which the method 300 is described is not intended to be construed as a limitation, and any number of the described method blocks may be combined in any order to implement the method 300, or an alternative method. Furthermore, the method 300 may be implemented by processor(s) or computing device(s) through any suitable hardware, non-transitory machine-readable instructions, or a combination thereof.

It may be understood that steps of the method 300 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 300 may be performed by the system 100 or the system 200. In particular, the method 300 may be performed by the processing unit 102 or the processing unit 202.

Referring to FIG. 3, at step 302, it may be determined if a first data is received. The first data may include a first plurality of data points. In response to the determination that the first data is received, the method 300 may proceed to step 304. On the other hand, if the first data is not received, the method 300 may await till the first data is received.

At step 304, the first plurality of data points may be partitioned into a first plurality of clusters. For the partitioning, a first model may be used. The first model may be, for example, DB-SCAN. In an example, the data points from the first plurality of data points that are connected to each other may be identified. Further, the first plurality of clusters may be formed based on the identification. Each of the first plurality of clusters may correspond to the data points of the first plurality of data points that are connected with each other. For instance, assume that there are 100 data points as first plurality of data points. Further, assume that 5 sets of densely-connected data points are identified. Each of the 5 sets of densely-connected data points may be partitioned into a cluster. Therefore, the first plurality of clusters may include 5 clusters.

In an example, consider the first data with the first plurality of data points in some space. Further, consider "ε" is a parameter specifying a radius of neighbourhood around a data point. For the DB-SCAN clustering, data points may be classified as core points, reachable points, and outliers, as follows.

A data point p is a core data point if at least minPts data points are within distance ε of the data point p (including data point p). A data point q is reachable from data point p if data point q is within distance ε from core data point p. Data points are only said to be directly reachable from core data points. A data point q is reachable from p if there is a path $p_1, \ldots, p_n$ with $p_1=p$ and $p_n=q$, where each $p_{i+1}$ is directly reachable from $p_i$. In other words, the initial data point and all data points on the path must be core data points, with the possible exception of q. All data points not reachable from any other data point are anomalies or noise data points. If the data point p is a core data point, it forms a cluster together with all data points (core or non-core) that are reachable from it. Each cluster contains at least one core point. The at least one non-core point can be part of a cluster, but they form an "edge", since they cannot be used to reach more points. Reachability is not a symmetric relation. Therefore, only core data points can reach non-core data points. However, a non-core data point may be reachable, but nothing can be reached from the non-core data point. A notion of connectedness is needed to formally define the extent of the clusters found by DB-SCAN. Two data points p and q are density-connected if there is a data point "o" such that both data points p and q are reachable from data point "o". Density-connectedness is symmetric. A cluster then satisfies two properties, as follows. All data points within the cluster are mutually density-connected and if a data point is density-reachable from some point of the cluster, the data points is part of the cluster as well. Using the above approach, densely-connected data points can be identified. Further, the partitioning may include determining an optimal number for the first plurality of data points.

For given distinct values of ε and a minimum number of neighbouring data points (min_samples) within the predetermined radius, assume ε∈E, and min_samples∈S, and let optimal number of clusters (opt_k)∈C-{1}. The optimal number of clusters (opt_k) which maximizes the following function may be choosen:

ε, opt_k=Arg max C{Pr[cluster k]>0.5}
If for k1, and k2, Pr[k1]>0.5 and
|Pr[k1]−Pr[k2]|<δ, where δ is a small number then,
opt_k=max{k1, k2} for given opt_k, eps=min {eps1, eps2, . . . , eps(m)}, and min_samples=max {m1, m2, . . . , m(o)} corresponding to opt_k. Further, ε in {eps1, eps2, . . . , eps(m)} and min_samples in {m1, m2, . . . , m(q)}, q>o, corresponding to that the optimal number of clusters opt_k densely connected data points.

At step 306, upon partitioning the first plurality of data points into the first plurality of clusters, functional form for each of the first plurality of clusters may be determined. For instance, functional form for each of the 5 clusters may be determined. As an example, assume that data points of the first plurality of data points are connected tightly together in n-dimension. The following relation at time t, $$X(k)=f(t,x(1),x(2),\ldots,x(k-1),x(k+1),\ldots,x(n))$$

The nature of relationship can be linear or nonlinear. A linear relationship is said to exist if:

$$c1.x(1)+c2.x(2)+\ldots+cn.x(n)=0, \text{ where } c(i)\in R,$$
where R is the set of real numbers and at least one c(i)!=0

For sake of simplicity, let x(1), x(2), . . . , x(k−1), x(k+1), . . . , x(n) be denoted together as x, and x(k) be denoted as y.

In an example, the relationship and the functional form may be derived using machine learning models, such as regression models, decision trees, random forests, artificial neural networks, and the like. The models can provide pieces of linear relationships, when combined, forms the nonlinear relationship.

Assume that using any one of the machine learning models, the best possible function "f(t, x)" at time t, with data availability till time t, to predict x(k) from other remaining dimensions/variables, such that, $$\Sigma|f(t,x)-y|<\varepsilon.$$

The functional form for a cluster c may be represented as f(c, t, x). Accordingly, the functional forms for each of the first plurality of clusters may be determined.

At step 308, it may be determined if a second data is received. The second data may include a second plurality of data points. The second data may correspond to the same data type as the first data. The second data is the data in which the anomaly may have to be found out. If it is determined that the second data is received, the method 300 may proceed to step 310. On the other hand, if it is determined that the second data is not received, the method 300 may repeat the step 308.

At step 310, the second plurality of data points may be compared with a threshold number of data points. For instance, assume that the threshold number of data points is 25. Further, assume that the second plurality of data points is 20. In this regard, the second plurality of data points (20) may be compared with the threshold number of data points (25).

At step 312, a margin of error for each of the second plurality of data points relative to functional forms of each of the first plurality of clusters if the second plurality of data points is lesser than the threshold number of data points. For instance, based on the comparison, it may be ascertained that the second plurality of data points (20) is lesser than the threshold number of data points (25). Therefore, in response to the ascertaining, the margin of error for each of the 20 data points relative to functional forms of each of the 5 clusters (first plurality of clusters) may be determined. In an example, sub-space of a cluster of the first plurality of clusters whose sub-space each of the second plurality of data points corresponding to may be identified. The margin of error of the data point relative to a functional form of the cluster of the first plurality of clusters whose sub-space the data point corresponds to. For instance, assume that a second data point of the second plurality of data points corresponds to a sub-space of a first cluster of the first plurality of clusters. In this regard, the margin of error of the second data point relative to a functional form of the first cluster may be detected.

At step 314, the detected margin of error for each of the second plurality of data points may be compared with a threshold margin of error.

Let p∈S(i) subspace,
p∈R(n−1)
v=f(c(i), t, p)
if |f(c(i), t, p)−y|>M

Data point (p, y) may be unbounded by region and the data point does not follow the function form and hence is an anomaly, where M>w.

At step 316, an anomaly in the second plurality of data points may be identified based on the comparison. For instance, if the detected margin of error of a data point is lesser than the threshold margin of error, the data point may be identified as an anomaly. On the other hand, if the detected margin of error of a data point is not lesser than the threshold margin of error, the data point may be identified as a normal point.

In some scenarios, there may be a higher number of second plurality of data points. In such scenarios, instead of detection of margin of errors, new functional forms may be determined, as will be explained below.

Figure 4:
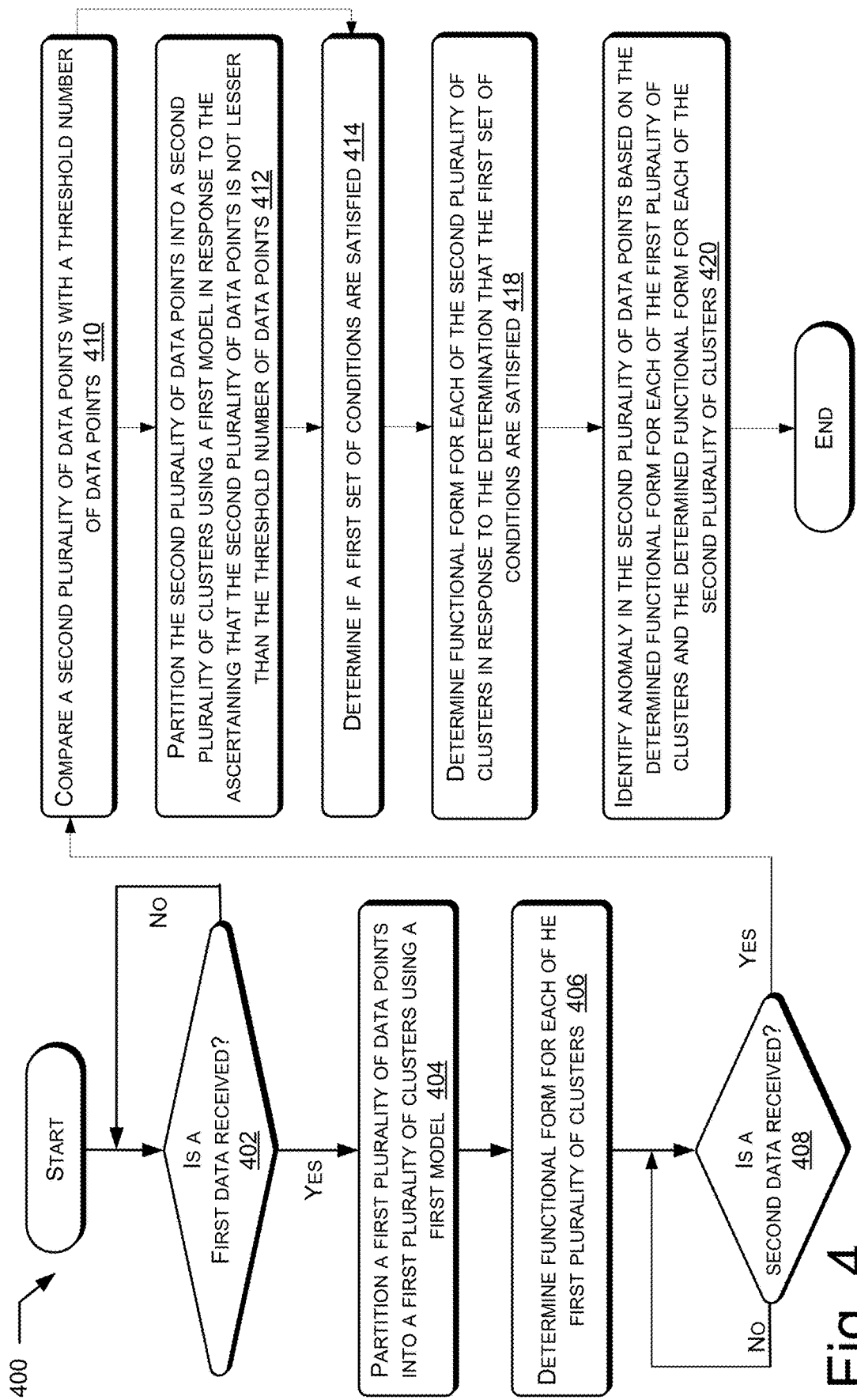
FIG. 4 illustrates a method for anomaly detection in data, according to an example implementation of the present subject matter.

FIG. 4 illustrates a method 400 for anomaly detection in data, according to an example implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 400 may be performed by the system 100 or the system 200. In particular, the method 400 may be performed by the processing unit 102 or the processing unit 202.

At step 402, it may be determined if a first data is received. The first data may include a first plurality of data points. In response to the determination that the first data is received, the method 400 may proceed to step 404. On the other hand, if the first data is not received, the method 400 may await till the first data is received.

At step 404, the first plurality of data points may be partitioned into a first plurality of clusters. For the partitioning, a first model may be used. The first model may be, for example, DB-SCAN. In an example, the data points from the first plurality of data points that are connected to each other may be identified. Further, the first plurality of clusters may be formed based on the identification. Each of the first plurality of clusters may correspond to the data points of the first plurality of data points that are connected with each other. The partitioning may include determining optimal number of the first plurality of data points. The partitioning of the first data into the first plurality of clusters using the DB-SCAN may be performed as explained with reference to step 302 of FIG. 3.

At step 406, in response to partitioning the first plurality of data points into the first plurality of clusters, functional form for each of the first plurality of clusters may be determined. The functional form may be derived using machine learning models, such as regression models, decision trees, random forests, artificial neural networks, and the like. The models can provide pieces of linear relationships, when combined, forms the nonlinear relationship. The determination of the functional form for each of the first plurality of clusters may be performed as explained with reference to step 306 of FIG. 3.

At step 408, it may be determined if a second data is received. The second data may include a second plurality of data points. The second data may correspond to the same data type as the first data. The second data is the data in which the anomaly may have to be found out. If it is determined that the second data is received, the method 400 may proceed to step 410. On the other hand, if it is determined that the second data is not received, the method 400 may repeat the step 408.

At step 410, the second plurality of data points may be compared with a threshold number of data points. For instance, assume that the threshold number of data points is 25. Further, assume that the second plurality of data points is 100. In this regard, the second plurality of data points (100) may be compared with the threshold number of data points (25).

At step 412, in response to the ascertaining that the second plurality of data points is not lesser that the threshold number of data points, the second plurality of data points may be partitioned into a second plurality of clusters. Each of the second plurality of clusters may correspond to data points of the second plurality of data points that are densely connected. For instance, based on the comparison, it may be ascertained that the second plurality of data points (100) is not lesser than the threshold number of data points (25).

Therefore, in response to the ascertaining, the second plurality of data points may be partitioned into the second plurality of clusters. The partitioning may be performed as explained with reference to step 304 of FIG. 3.

At step 414, it may be determined if a first set of conditions are satisfied upon partitioning the second plurality of data points into the second plurality of clusters. The first set of conditions may include determining if data points among the second plurality of data points are densely connected. In addition, the second set of conditions may include determination of link strength for each of the second plurality of clusters relative to each of the first plurality of clusters. The link strength may be indicative of number of data points of a cluster of the second plurality of clusters that are common with data points of a cluster of the first plurality of clusters. Accordingly, to determine the link strength for each of the second plurality of clusters relative to the first plurality of clusters, number of common data points that are common between each of the second plurality of clusters, each of the first plurality of clusters, and a hypersphere of a predetermined radius may be identified. In an example, the link strength of each of the second plurality of clusters may be determined relative to the sub-space of the cluster of the first plurality of clusters to which the cluster of the second plurality of clusters corresponds to. Further, the determined link strength for each of the second plurality of clusters relative to the first plurality of clusters with may be compared a threshold number of common data points. It may be established that the link strength of a cluster of the second plurality of clusters relative to a cluster of the first plurality of clusters is weak based on the comparison. For instance, assume there are 5 clusters corresponding to the first plurality of data points (i.e., first plurality of clusters is 5). Further, if the determined link strength is lesser than the threshold number of common data points, it may be established that the link strength is weak. As an example, out of 100 data points, 4 sets of data points that are densely-connected are identified. Each of 4 sets of data points may include 20 data points each. Further, each set of densely-connected data points may be formed as a cluster. Therefore, four clusters are formed. The link strength for each of the 4 clusters relative to each of the five of the first plurality of clusters may be determined. In particular, assume that the second cluster of the second plurality of clusters corresponds to sub-space of the first cluster of the first plurality of clusters. Accordingly, the link strength for the second cluster of the second plurality of clusters relative to the first cluster of the first plurality of clusters may be determined. Assume that there are 25 common data points between the third cluster of the second plurality of clusters, the first cluster of the first plurality of clusters, and a hypersphere of a predetermined radius. The link strength may be determined as 25. Further, assume that the threshold number of common data points is 30. The link strength (25) may be compared with the threshold number of common data points (30). Based on the comparison, it may be ascertained that the link strength is lesser than the threshold number of common data points and it may be established the link strength is weak. This may be performed for each of the four clusters of the second plurality of clusters.

At step 418, in response to the determination that the first set of conditions are satisfied, functional form for each of the first plurality of clusters may be determined. In particular, in response to the determination that the link strength is weak, the functional form for each of the second plurality of clusters (i.e., 4 clusters) may be determined. The determination of the functional form may be performed as explained with reference to step 306 of FIG. 3.

As an example, the functional forms for each of the second plurality of clusters may be determined if the link strength between second plurality of clusters and for all the previous existing clusters (the first plurality of clusters) (C) is weak. The link strength may be weak if for any C, and a cluster of the second plurality of clusters with data points P is such that, $$|C \cap P \cap H(\varepsilon)| < K, \forall C \text{ in} \{C(1), C(2), \ldots, C(n)\}$$

In other words, the link strength is weak that, among any one of the first plurality of clusters C, a cluster of the second plurality of clusters with data points P and a hypersphere H of radius ε includes at a maximum less than threshold number of data points (K points) in common. Further, the second set of conditions may include that a subset of the data points P is also densely connected.

At step 420, an anomaly in the second plurality of data points may be identified based on the determined functional form for each of the second plurality of clusters and the determined functional form for each of the first plurality of clusters. For instance, if a data point in the second plurality of data points does not satisfy the functional form of any one of the first plurality of clusters or the functional form of any one of the second plurality of clusters, then the data point may be identified as the anomaly. If a data point in the second plurality of data points satisfies the functional form any one of the first plurality of clusters or satisfies the functional form of any one of the second plurality of clusters, then the data point may be identified as a normal data point.

In some scenarios, there may be a higher number of second plurality of data points. In such scenarios, instead of deriving new functional forms, functional forms of the first plurality of clusters may be updated, as will be explained below.

Figure 5:
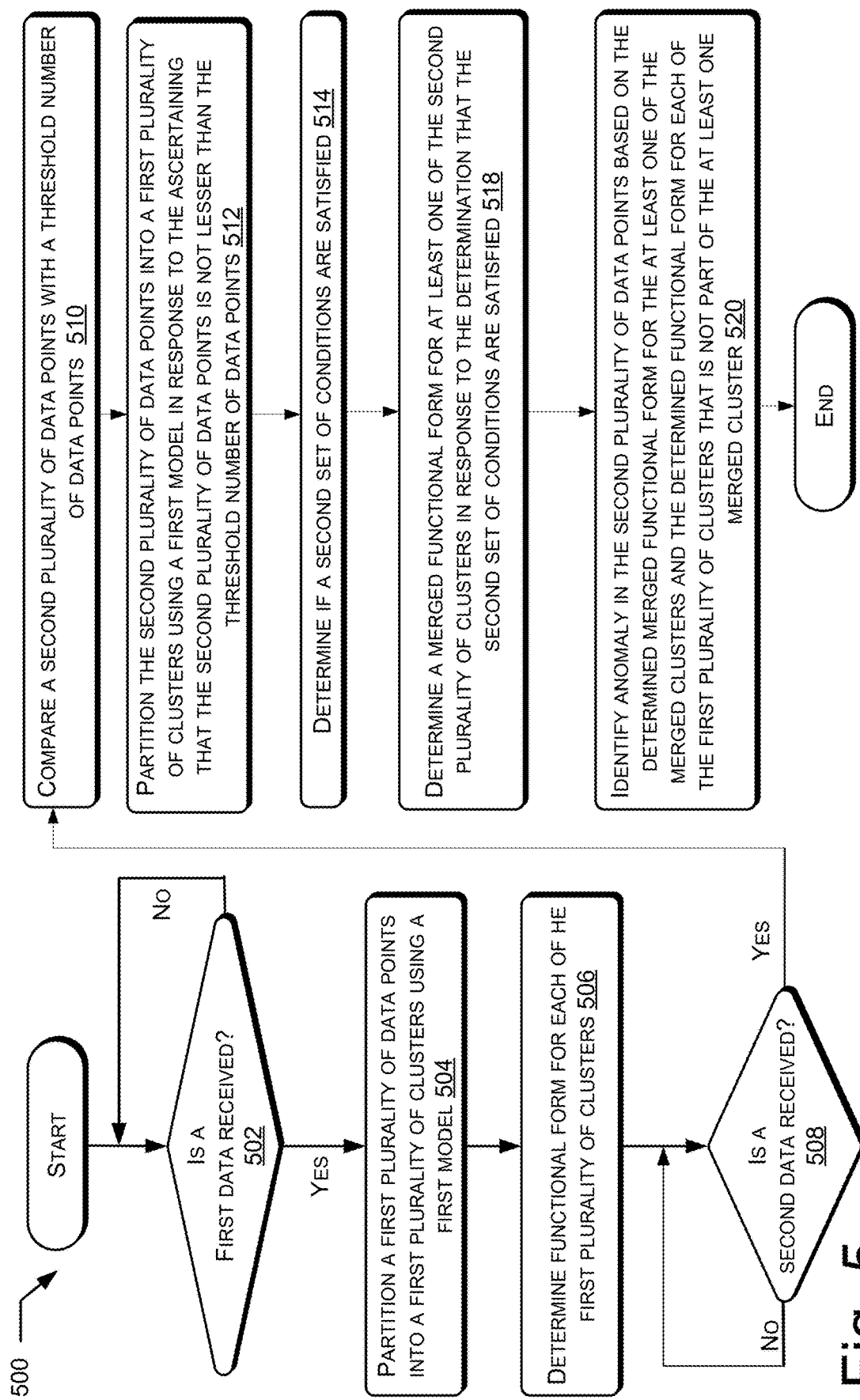
FIG. 5 illustrates a method for anomaly detection in data, according to an example implementation of the present subject matter.

FIG. 5 illustrates a method 500 for anomaly detection in data, according to an example implementation of the present subject matter. The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by the system 100 or the system 200. In particular, the method 500 may be performed by the processing unit 102 or the processing unit 202.

At step 502, it may be determined if a first data is received. The first data may include a first plurality of data points. In response to the determination that the first data is received, the method 500 may proceed to step 504. On the other hand, if the first data is not received, the method 500 may await till the first data is received.

At step 504, the first plurality of data points may be partitioned into a first plurality of clusters. For the partitioning, a first model may be used. The first model may be, for example, DB-SCAN. In an example, the data points from the first plurality of data points that are connected to each other may be identified. Further, the first plurality of clusters may be formed based on the identification. Each of the first plurality of clusters may correspond to the data points of the first plurality of data points that are connected with each other. For instance, assume that there are 100 data points as first plurality of data points. Further, assume that the 5 sets of densely-connected data points are identified. Each of the 5 sets of densely-connected data points may be partitioned into a cluster. Therefore, the first plurality of clusters may include 5 clusters. The partitioning may include determining optimal number of the first plurality of data points. The partitioning of the first data into the first plurality of clusters using the DB-SCAN may be performed as explained with reference to step 302 of FIG. 3.

At step 506, in response to partitioning the first plurality of data points into the first plurality of clusters, functional form for each of the first plurality of clusters may be determined. For instance, functional form for each of the 5 clusters may be determined. The functional form may be derived using machine learning models, such as regression models, decision trees, random forests, artificial neural networks, and the like. The models can provide pieces of linear relationships, when combined, forms the nonlinear relationship. The determination of the functional form for each of the first plurality of clusters may be performed as explained with reference to step 306 of FIG. 3.

At step 508, it may be determined if a second data is received. The second data may include a second plurality of data points. The second data may correspond to the same data type as the first data. The second data is the data in which the anomaly may have to be found out. If it is determined that the second data is received, the method 500 may proceed to step 510. On the other hand, if it is determined that the second data is not received, the method 500 may repeat the step 508.

At step 510, the second plurality of data points may be compared with a threshold number of data points. For instance, assume that the threshold number of data points is 25. Further, assume that the second plurality of data points is 100. In this regard, the second plurality of data points (100) may be compared with the threshold number of data points (25).

At step 512, in response to the ascertaining that the second plurality of data points is not lesser that the threshold number of data points, the second plurality of data points may be partitioned into a second plurality of clusters. Each of the second plurality of clusters may correspond to data points of the second plurality of data points that are densely connected. For instance, based on the comparison, it may be ascertained that the second plurality of data points (100) is not lesser than the threshold number of data points (25). Therefore, in response to the ascertaining, the second plurality of data points may be partitioned into the second plurality of clusters. The partitioning may be performed as explained with reference to step 304 of FIG. 3.

At step 514, it may be determined if a second set of conditions are satisfied upon partitioning the second plurality of data points into the second plurality of clusters. The second set of conditions may include determining if data points among the second plurality of data points are densely connected. In addition, the second set of conditions may include determination of link strength for each of the second plurality of clusters relative to each of the first plurality of clusters. The link strength may be indicative of number of data points of a cluster of the second plurality of clusters that are common with data points of a cluster of the first plurality of clusters. Accordingly, to determine the link strength for each of the second plurality of clusters relative to the first plurality of clusters, number of common data points that are common between each of the second plurality of clusters, each of the first plurality of clusters, and a hypersphere of a predetermined radius may be identified. In an example, the link strength of each of the second plurality of clusters may be determined relative to the sub-space of the cluster of the first plurality of clusters to which the cluster of the second plurality of clusters corresponds to. Further, the determined link strength for each of the second plurality of clusters relative to the first plurality of clusters with may be compared a threshold number of common data points. It may be established that the link strength of a cluster of the second plurality of clusters relative to a cluster of the first plurality of clusters is strong based on the comparison.

For instance, if the determined link strength is not lesser than the threshold number of common data points, it may be established that the link strength is strong. As an example, out of 100 data points, 4 sets of data points that are densely-connected are identified. Each of 4 sets of data points may include 20 data points each. Further, each set of densely-connected data points may be formed as a cluster. Therefore, four clusters are formed. The link strength for each of the 4 clusters relative to each of the five of the first plurality of clusters may be determined. In particular, assume that the second cluster of the second plurality of clusters corresponds to sub-space of the first cluster of the first plurality of clusters. Accordingly, the link strength for the second cluster of the second plurality of clusters relative to the first cluster of the first plurality of clusters may be determined. Assume that there are 55 common data points between the third cluster of the second plurality of clusters, the first cluster of the first plurality of clusters, and a hypersphere of a pre-determined radius. The link strength may be determined as 55. Further, assume that the threshold number of common data points is 30. The link strength (55) may be compared with the threshold number of common data points (30). Based on the comparison, it may be ascertained that the link strength is not lesser than the threshold number of common data points and it may be established the link strength is strong. This may be performed for each of the four clusters of the second plurality of clusters.

In addition, the second set of conditions may also include determination if there are no sharp corners in a region corresponding to the hypersphere of the predetermined radius. Further, the second set of conditions may also include determination that there are no bends in the region of the hypersphere.

At step 518, in response to the determination that the second set of conditions are satisfied, a merged functional form for at least one of the second plurality of clusters may be determined. In particular, in response to the determination that the link strength is strong, the merged functional form for at least one of the second plurality of clusters (i.e., 4 clusters) may be determined. To obtain a merged functional form, the at least one cluster of the second plurality of clusters may be merged with a cluster of the first plurality of clusters with which the cluster of the second plurality of clusters has a strong link strength. For instance, assume that for a second cluster of the second plurality of clusters, the link strength is established to be strong relative to a third cluster of the first plurality of clusters. In this regard, the second cluster of the second plurality of clusters may be merged with the third cluster of the first plurality of clusters to form a merged cluster. Further, a merged functional form may be determined for the merged cluster. The determination of the merged functional form may be performed as explained with reference to step 306 of FIG. 3.

As an example, the functional forms for each of the second plurality of clusters may be determined if the link strength between second plurality of clusters and for all the previous existing clusters (the first plurality of clusters) (C) is strong. The link strength may be strong if for any C, and a cluster of the second plurality of clusters with data points P is such that, $$|C \cap P \cap H(\varepsilon)| >= K$$

In other words, the link strength is strong that, among any one of the first plurality of clusters C, a cluster of the second plurality of clusters with data points P and a hypersphere H of radius ε contains at least a threshold number of data points (K points) in common. Further, the second set of conditions may include that a subset of the data points P is also densely connected. Further, in region of H(ε), the variable y is smooth. In other words, there are no sharp corners in the region corresponding to H(ε). Ideally, the functional f(c, t, x) is differentiable in H(ε) region. Approximation to evaluate this is to, for C, and P, For points p(C) in C in the neighborhood H(ε),
And points p(P) in P in the neighborhood H(ε),
$|p(c) \cap p(P)|=0$ and $|\bar{y}(p(C))-\bar{y}(p(P))|<\delta$.

P does not bend from H(ε), i.e. for any x in R(n−1), and y1 in C and y2 in P, where (x, y1) and (x, y2) are distinct points and y1!=y2, then if does not follow the functional relationship. In other words, P does not have any bend in the region corresponding to H(ε). If all the conditions satisfy then C and P are merged and merged functional form f(C U P, t+1, x) may be derived.

At step 520, an anomaly in the second plurality of data points may be identified based on the determined merged functional form for the at least one of the merged clusters and the determined functional form for each of the first plurality of clusters that is not part of the at least one merged cluster. For instance, if a data point in the second plurality of data points does not satisfy the merged functional form for at least one of the merged clusters and the functional form for any of the first plurality of clusters that is not part of the at least one merged clusters, then the data point may be identified as the anomaly. If a data point in the second plurality of data points satisfies the functional form of any of the first plurality of clusters that is not part of the at least one merged cluster or satisfies the functional form of at least one of the merged clusters, then the data point may be identified as a normal data point.

The above example is explained with reference to obtaining merged functional form for at least one merged cluster by merging at least one of the first plurality of clusters and at least one of the second plurality of clusters. However, in addition to obtaining merged functional form, functional forms for the second plurality of clusters that are not part of the at least one merged cluster may be obtained, as explained with reference to step 418 of FIG. 4. In such scenario, the anomaly in the second plurality of data points may be identified based on the determined functional form for the at least one merged cluster, the determined functional form for each of the first plurality of clusters that are not part of the at least one merged cluster and the determined functional form for each of the second plurality of clusters that are not part of the at least one merged cluster.

In some scenarios, the clusters may saturate and may no longer be updated at a future point in time. Accordingly, to enhance the accuracy of the identification of the anomaly in data, the saturation of the clusters may have to be determined. The detection of the anomaly in the data based on the saturation of functional forms of the clusters will be explained as follows.

Figure 6:
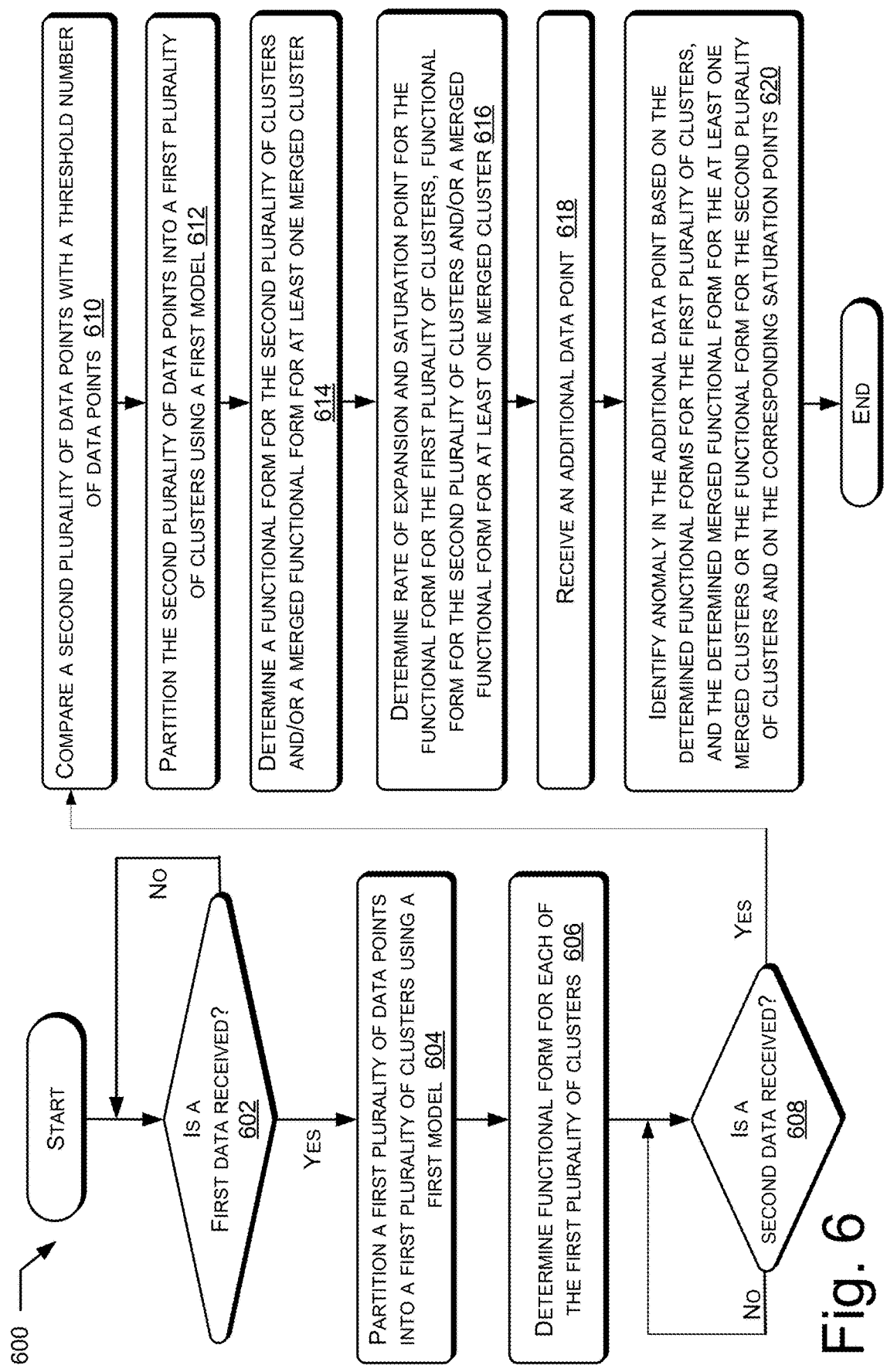
FIG. 6 illustrates a method for anomaly detection in data, according to an example implementation of the present subject matter.

FIG. 6 illustrates a method 600 for anomaly detection in data, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 600 may be performed by the system 100 or the system 200. In particular, the method 600 may be performed by the processing unit 102 or the processing unit 202.

At step 602, it may be determined if a first data is received. The first data may include a first plurality of data points. In response to the determination that the first data is received, the method 600 may proceed to step 604. On the other hand, if the first data is not received, the method 600 may await till the first data is received.

At step 604, the first plurality of data points may be partitioned into a first plurality of clusters. For the partitioning, a first model may be used. The first model may be, for example, DB-SCAN. In an example, the data points from the first plurality of data points that are connected to each other may be identified. Further, the first plurality of clusters may be formed based on the identification. Each of the first plurality of clusters may correspond to the data points of the first plurality of data points that are connected with each other. The partitioning may include determining optimal number of the first plurality of data points. The partitioning of the first data into the first plurality of clusters using the DB-SCAN may be performed as explained with reference to step 302 of FIG. 3.

At step 606, in response to partitioning the first plurality of data points into the first plurality of clusters, functional form for each of the first plurality of clusters may be determined. The functional form may be derived using machine learning models, such as regression models, decision trees, random forests, artificial neural networks, and the like. The models can provide pieces of linear relationships, when combined, forms the nonlinear relationship. The determination of the functional form for each of the first plurality of clusters may be performed as explained with reference to step 306 of FIG. 3.

At step 608, it may be determined if a second data is received. The second data may include a second plurality of data points. The second data may correspond to the same data type as the first data. If it is determined that the second data is received, the method 600 may proceed to step 610. On the other hand, if it is determined that the second data is not received, the method 600 may repeat the step 608.

At step 610, the second plurality of data points may be compared with a threshold number of data points. For instance, assume that the threshold number of data points is 25. Further, assume that the second plurality of data points is 100. In this regard, the second plurality of data points (100) may be compared with the threshold number of data points (25).

At step 612, in response to the ascertaining that the second plurality of data points is not lesser that the threshold number of data points, the second plurality of data points may be partitioned into a second plurality of clusters. Each of the second plurality of clusters may correspond to data points of the second plurality of data points that are densely connected. The partitioning may be performed as explained with reference to step 304 of FIG. 3.

At step 614, functional form for each of the second plurality of clusters may be determined. In another example, merged functional form for the at least one merged cluster may be determined. The merged functional form may be formed by merging at least one of the first plurality of clusters and at least one of the second plurality of clusters. In an example, merged functional form corresponding to at least one merged cluster corresponding to at least one of the first plurality of clusters and at least one of the second plurality of clusters may be determined and functional form for some of the second plurality of clusters that are not part of the at least one merged cluster may be determined. The functional form for each of the plurality of clusters may be determined if a first set of conditions are satisfied, as explained with reference to steps 414 and 418 of FIG. 4. On the other hand, merged functional form for the at least one merged cluster may be determined if a second set of conditions are satisfied, as explained with reference to steps 514 and 518 of FIG. 5.

At step 616, the rate of expansion may be determined for the determined functional form of the first plurality of clusters and the determined functional form for the second plurality of clusters. Further, based on the rate of expansion, saturation points for functional form of each of the first plurality of clusters and saturation points for functional form of each of the second plurality of clusters may be determined.

In another example, the rate of expansion may be determined for the determined functional form for at least one merged cluster and the determined functional form for each of the first plurality of clusters that are not part of the at least one merged cluster. Further, saturation points for the functional form of each of the first plurality of clusters that are not part of the at least one merged cluster and saturation points for the functional form of the at least one merged cluster may be determined based on the rate of expansion.

In yet another example, the rate of expansion may be determined for the merged functional form of the at least one merged clusters, the determined functional forms for each of the first plurality of clusters that are not part of the at least one merged cluster, and the determined functional forms for each of the second plurality of clusters that are not part of the at least one merged cluster. Further, saturation points for the merged functional form for the at least one merged clusters, saturation points for the functional form for each of the first plurality of clusters that are not part of the at least one merged cluster, and saturation points for each of the second plurality of clusters that are not part of the at least one merged cluster may be determined.

Rate of expansion, $r(i)=x(i, t+1)-x(i, t)$, where t corresponds to time. Assume that a point P follows a functional form f(c). In this regard, expected time to arrive at point p is max $\{((p(i)-x(t, i))/r\{i\})\}$, in densely-connected manner. The saturation of of the functional form, S(C), can be computed as:

$$S(x(i))=*f(x(i,t+1)-x(i,t)) \text{ for each } i \text{ in}\{1,2,\ldots,n\}.$$

This is possible when the series $\Sigma x(i, t+1)-x(i, t)$ is convergent. * is an operator of choice suitable for calculating the saturation. As will be understood, the saturation points may be calculated only after two data are received and an expansion is seen.

At step 618, a third data may be received. The third data may include an additional data point. The anomaly in the third data may have to be determined. In other words, it may have to be determined if the additional data point is an anomaly.

At step 620, anomaly in the additional data point may be identified based on the determined functional forms and saturation points. For instance, in an example, if the additional data point does not satisfy determined functional form of any one of the first plurality of clusters, the determined functional form for any one of the second plurality of clusters, or if the additional data point satisfies either of the determined functional forms but is not bounded by corresponding saturation points, then additional data point may be identified as an anomaly. On the other hand, if the additional data point satisfies determined functional form of any one of the first plurality of clusters and is bounded by the corresponding saturation points or the additional data point satisfies the determined functional form of any one of the second plurality of clusters and is bounded by the corresponding saturation points, then the additional data point may be identified as a normal data point.

In another example, if the additional data point does not satisfy the the determined merged functional form for the at least one merged cluster, or the determined functional form for any one of the first plurality of clusters that are not part of the at least one merged cluster, or it satisfies either but is not bounded by the corresponding saturation points, then the additional data point may be identified as an anomaly. In contrast, if the additional data point satisfies the determined merged functional form for the at least one merged cluster and is bounded by the corresponding saturation point, or the determined functional form of any one of the first plurality of clusters that are not part of the at least one merged cluster and is bounded by the corresponding saturation points, then the additional data point may be identified as a normal point.

In yet another example, the additional data point may be identified as an anomaly if the additional data point does not satisfy the merged functional form of the at least one merged clusters, the determined functional forms for any one of the first plurality of clusters that are not part of the at least one merged cluster, or the determined functional forms for any one of the second plurality of clusters that are not part of the at least one merged cluster, or if the additional data point satisfies any one of the above but is not bounded by the corresponding saturation points. On the other hand, the additional data point may be identified as a normal data point if the additional data point satisfies the merged functional form of the at least one merged clusters and is bounded by the corresponding saturation point, or satisfies the determined functional forms for any one of the first plurality of clusters that are not part of the at least one merged cluster and is bounded by the corresponding saturation point, or satisfies the determined functional forms for any one of the second plurality of clusters that are not part of the at least one merged cluster and is bounded by the corresponding saturation point.

Figure 7A:
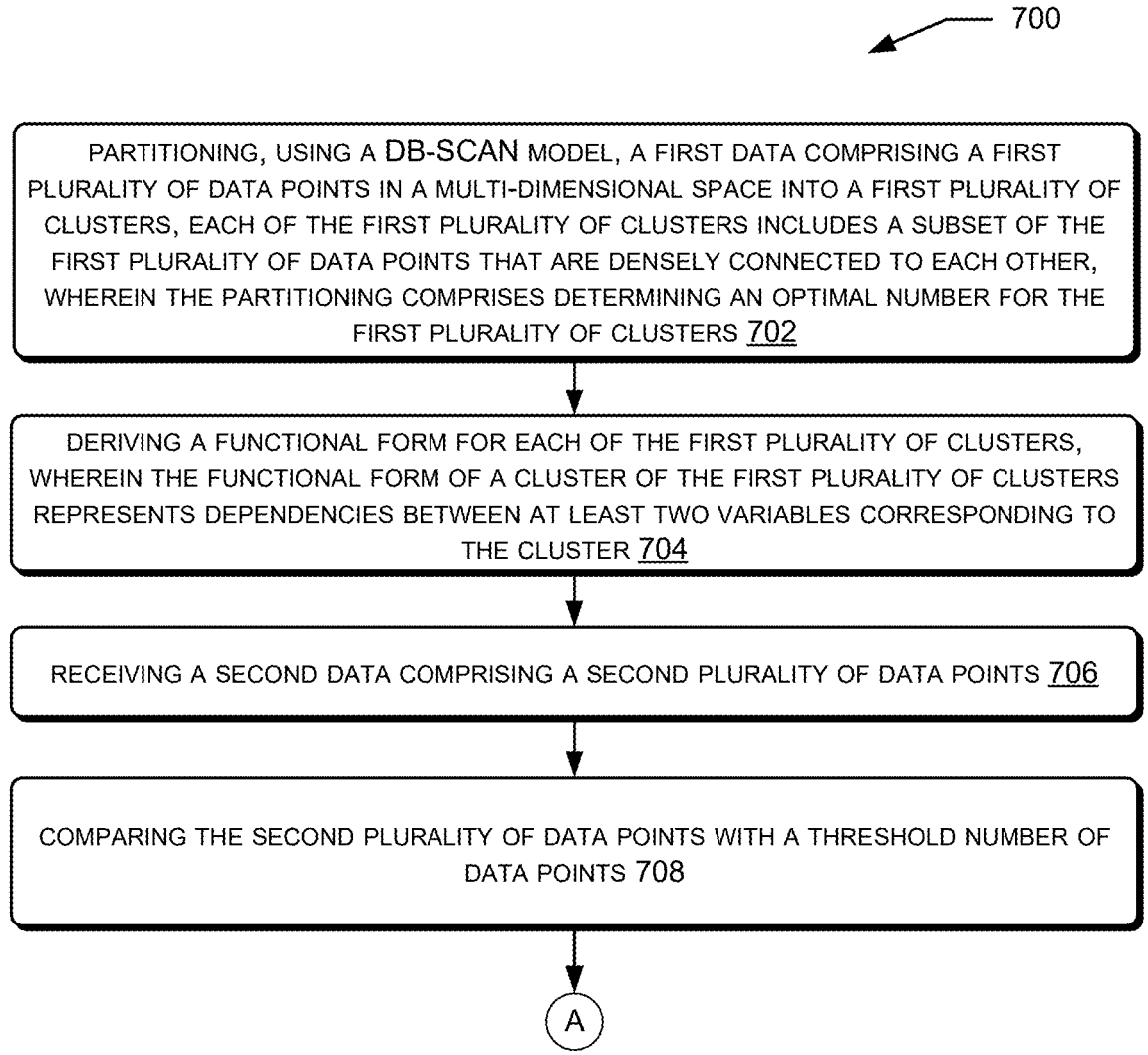
FIGS. 7a-7b illustrate a method for anomaly detection in data, according to an example implementation of the present subject matter.
Figure 7B:
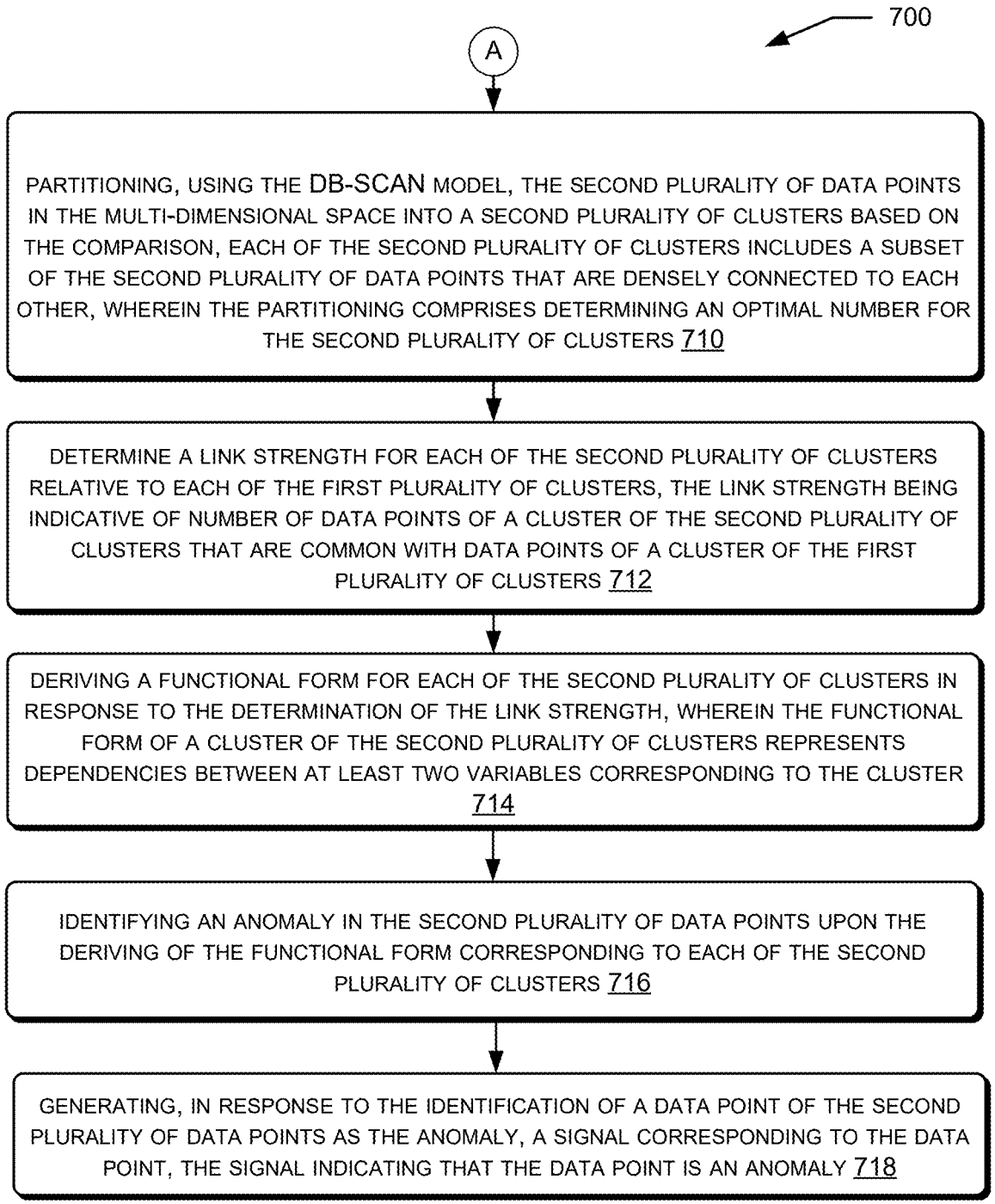

FIGS. 7a-7b illustrate a method 700 for anomaly detection in data, according to an example implementation of the present subject matter. The order in which the method 700 is described is not intended to be construed as a limitation, and any number of the described method blocks may be combined in any order to implement the method 700, or an alternative method. Furthermore, the method 700 may be implemented by processor(s) or computing device(s) through any suitable hardware, non-transitory machine-readable instructions, or a combination thereof.

It may be understood that steps of the method 700 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 700 may be performed by the system 100 or the system 200. In particular, the method 700 may be performed by the processing unit 102 or the processing unit 202.

At step 702, the method 700 may include partitioning, using a DB-SCAN model, a first data comprising a first plurality of data points in a multi-dimensional space into a first plurality of clusters. Each of the first plurality of clusters may include a subset of the first plurality of data points that are densely connected to each other. The partitioning may include determining an optimal number for the first plurality of clusters.

At step 704, a functional form may be derived for each of the first plurality of clusters. The functional form of a cluster of the first plurality of clusters represents dependencies between at least two variables corresponding to the cluster. At step 706, a second data including a second plurality of data points may be received. At step 708, the second plurality of data points may be compared with a threshold number of data points.

Referring to FIG. 7b, at step 710, the method 700 may include partitioning, using the DB-SCAN model, the second plurality of data points in the multi-dimensional space into a second plurality of clusters based on the comparison. Each of the second plurality of clusters may include a subset of the second plurality of data points that are densely connected to each other. The partitioning may include determining an optimal number for the second plurality of clusters.

At step 712, a link strength for each of the second plurality of clusters relative to each of the first plurality of clusters may be determined. The link strength may be indicative of number of data points of a cluster of the second plurality of clusters that are common with data points of a cluster of the first plurality of clusters.

At step 714, a functional form for each of the second plurality of clusters may be derived in response to the determination of the link strength. The functional form of a cluster of the second plurality of clusters may represent dependencies between at least two variables corresponding to the cluster. In an example, the method may include deriving the functional forms for the first plurality of clusters and functional forms for the second plurality of clusters using one of: regression model, a decision tree model, a random forest model, and an Artificial Neural Network model.

At step 716, an anomaly in the second plurality of data points may be identified upon the deriving of the functional form corresponding to each of the second plurality of clusters. At step 718, the method 700 may include generating, in response to the identification of a data point of the second plurality of data points as the anomaly, a signal corresponding to the data point, the signal indicating that the data point is an anomaly.

In an example, it may be ascertained if the second plurality of data points are not lesser than a threshold number of data points. Further, the second plurality of data points may be partitioned using the DB-SCAN model into the second plurality of clusters in the multi-dimensional space based on the ascertaining that the second plurality of data points are not lesser than the threshold number of data points.

Further, it may be ascertained if the second plurality of data points are lesser than a threshold number of data points based on the comparison. A margin of error for each data point of the second plurality of data points relative to the functional form of each of the first plurality of clusters may be detected based on the ascertaining that the second plurality of data points is lesser than the threshold number of data points. The method 700 may include identifying if each data point of the second plurality of data points is an anomaly based on the detected margin of error for each data point of the second plurality of data points relative to the functional forms of each of the first plurality of clusters.

In an example, in response to determining the link strength between each of the second plurality of clusters and each of the first plurality of clusters, the determined link strength for each of the second plurality of clusters relative to the first plurality of clusters may be compared with a threshold number of common data points. The method 700 may include establishing that the link strength of a cluster of the second plurality of clusters relative to a cluster of the first plurality of clusters is weak based on the comparison. A functional form for each of the second plurality of clusters may be derived in response to the establishing that the link strength is weak.

The determination of the link strength for each of the second plurality of clusters relative to the first plurality of clusters may include identifying number of common data points that are common between each of the second plurality of clusters, each of the first plurality of clusters, and a hypersphere of a predetermined radius.

In an example, it may be ascertained that the second plurality of data points are higher than the threshold number of data points. The second plurality of data points may be partitioned in the multi-dimensional space into the second plurality of clusters based on the ascertaining that the second plurality of data points are higher than the threshold number of data points. The method 700 may include determining the link strength for each of the second plurality of clusters relative to each of the first plurality of clusters. The determined link strength for each of the second plurality of clusters may be compared with a threshold number of common data points. The method 700 may include establishing that the link strength of a cluster of the second plurality of clusters relative a cluster of the first plurality of clusters is strong in response to identifying that number of data points of the cluster of the second plurality of clusters that are common with data points of the cluster of the first plurality of clusters is not lesser than a threshold number of common data points. At least one merged cluster may be formed, using the DB-SCAN model, by merging at least one of the first plurality of clusters and at least one of the second plurality of clusters in response to establishing that the link strength is strong. A merged functional form for the at least one merged cluster may be determined. The functional form of the at least one merged cluster may represent dependencies between at least two variables corresponding to the at least one merged cluster. An anomaly in the second plurality of data points may be identified based on the functional form corresponding to each of the first plurality of clusters that are not part of the at least one merged cluster, functional form corresponding to each of the second plurality of clusters that are not part of the at least one merged cluster, and functional form of the at least one merged cluster.

Figure 8A:
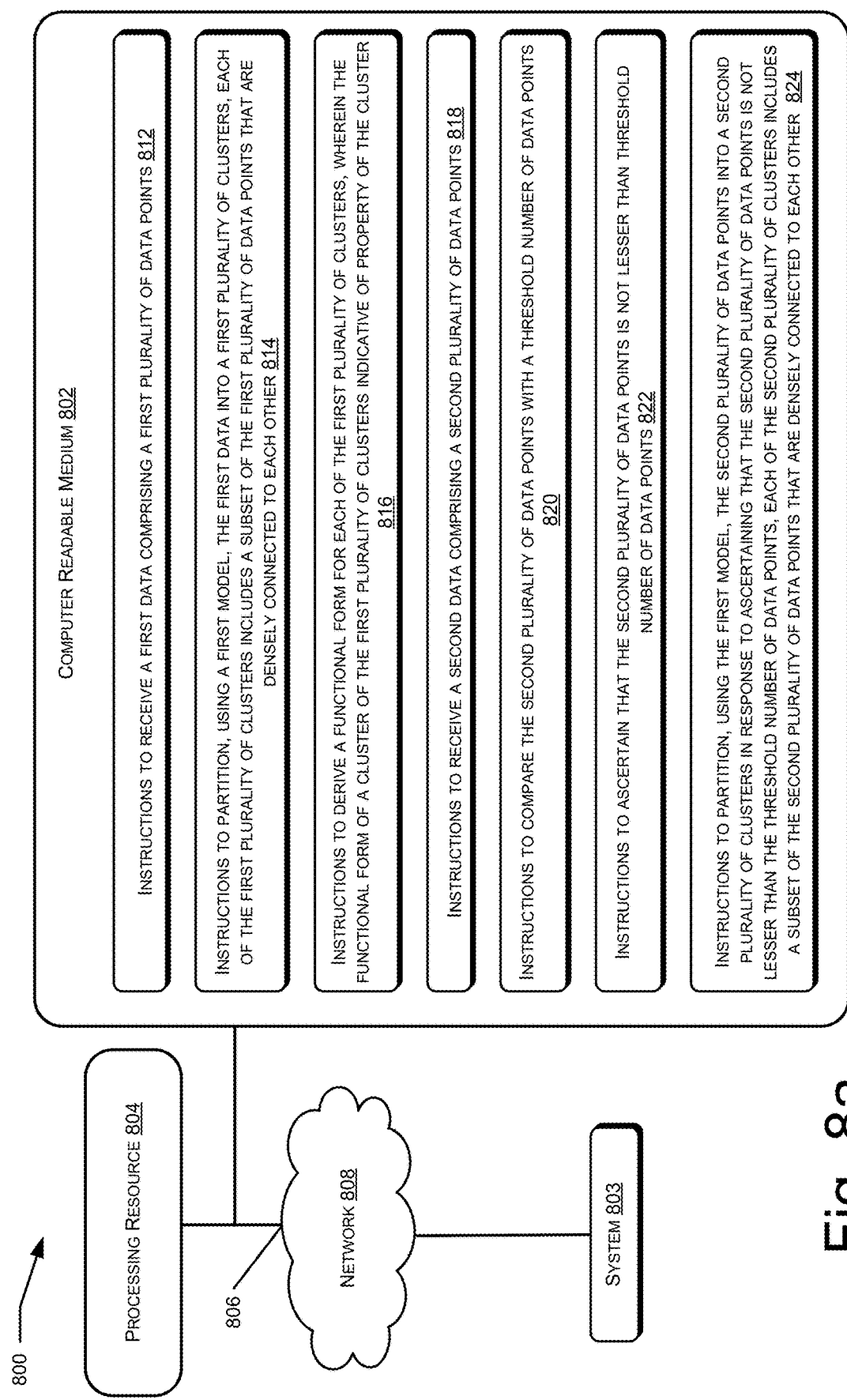
FIGS. 8a-8b illustrate a computing environment, implementing a non-transitory computer-readable medium for anomaly detection in data, according to an example implementation of the present subject matter.
Figure 8B:
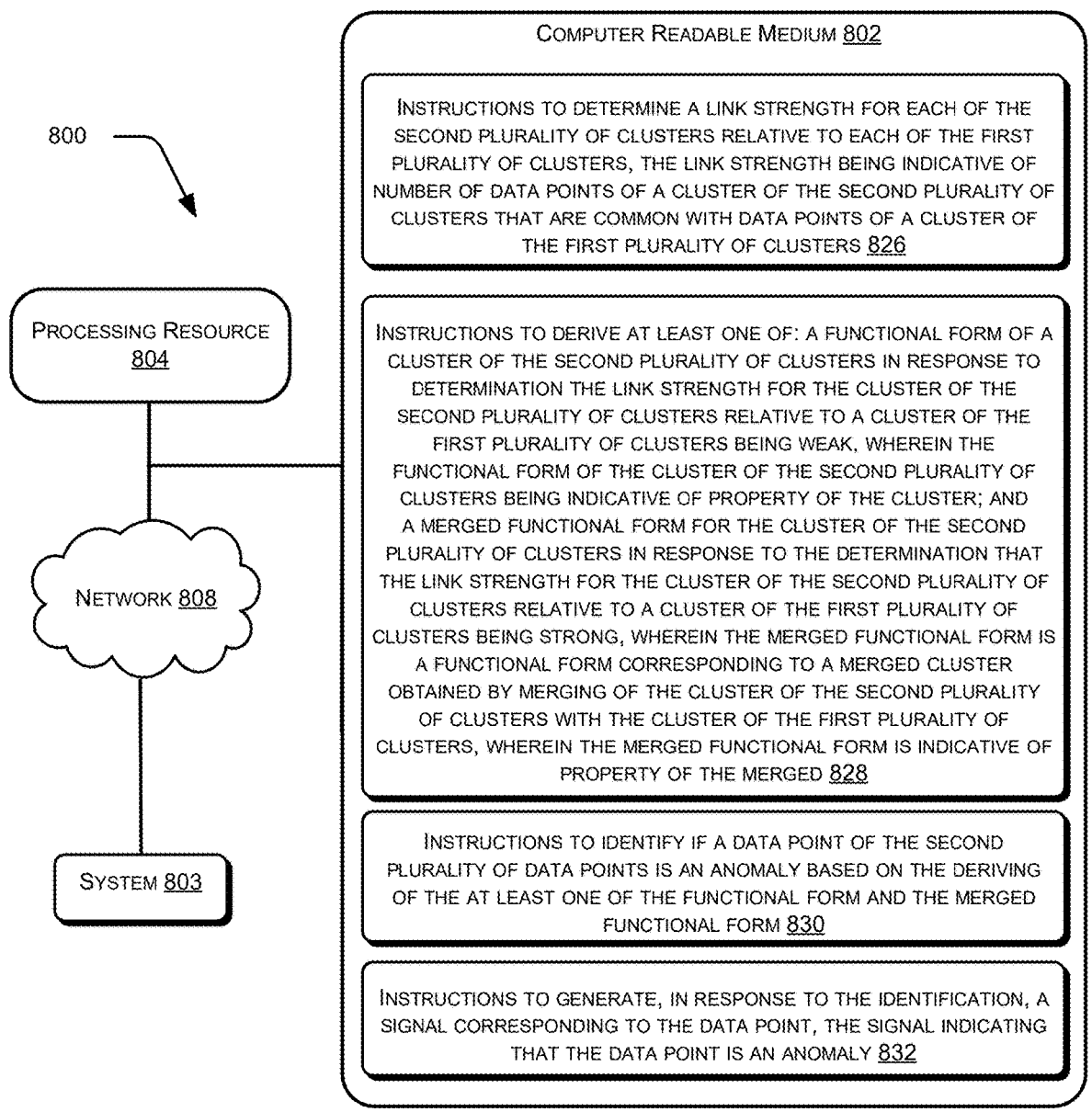

FIGS. 8a-8b illustrate a computing environment 800, implementing a non-transitory computer-readable medium for anomaly detection in data, according to an example implementation of the present subject matter. In an example, the non-transitory computer-readable medium 802 may be utilized by the system 803. The system 803 may correspond to the system 100 or the system 200. The system 803 may be implemented in a public networking environment or a private networking environment. In an example, the computing environment 800 may include a processing resource 804 communicatively coupled to the non-transitory computer-readable medium 802 through a communication link 806.

In an example, the processing resource 804 may be implemented in a device, such as the system 803. The non-transitory computer-readable medium 802 may be, for example, an internal memory device of the system 803 or an external memory device. In an implementation, the communication link 806 may be a direct communication link, such as any memory read/write interface. In another implementation, the communication link 806 may be an indirect communication link, such as a network interface. In such a case, the processing resource 804 may access the non-transitory computer-readable medium 802 through a network 808. The network 808 may be a single network or a combination of multiple networks and may use a variety of different communication protocols. The processing resource 804 and the non-transitory computer-readable medium 802 may also be communicatively coupled to the system 803 over the network 808.

In an example implementation, the non-transitory computer-readable medium 802 includes a set of computer-readable instructions for anomaly detection in data. The set of computer-readable instructions can be accessed by the processing resource 804 through the communication link 806 and subsequently executed to perform acts for anomaly detection in data.

Referring to FIG. 8a, in an example, the non-transitory computer-readable medium 802 includes instructions 812 to receive a first data comprising a first plurality of data points. Further, the non-transitory computer-readable medium 802 includes instructions 814 to partition, using a first model, the first data into a first plurality of clusters. Each of the first plurality of clusters may include a subset of the first plurality of data points that are densely connected to each other.

The non-transitory computer-readable medium 802 includes instructions 816 to derive a functional form for each of the first plurality of clusters. The functional form of a cluster of the first plurality of clusters may be indicative of property of the cluster. The non-transitory computer-readable medium 802 includes instructions 818 to receive a second data comprising a second plurality of data points.

The non-transitory computer-readable medium 802 includes instructions 820 to compare the second plurality of data points with a threshold number of data points. The non-transitory computer-readable medium 802 includes instructions 822 to ascertain that the second plurality of data points is not lesser than threshold number of data points.

The non-transitory computer-readable medium 802 includes instructions 824 to partition, using the first model, the second plurality of data points into a second plurality of clusters in response to ascertaining that the second plurality of data points is not lesser than the threshold number of data points. Each of the second plurality of clusters may include a subset of the second plurality of data points that are densely connected to each other.

Referring to FIG. 8b, the non-transitory computer-readable medium 802 includes instructions 826 to determine a link strength for each of the second plurality of clusters relative to each of the first plurality of clusters. The link strength may be indicative of number of data points of a cluster of the second plurality of clusters that are common with data points of a cluster of the first plurality of clusters.

The non-transitory computer-readable medium 802 includes instructions 828 to derive a functional form of a cluster of the second plurality of clusters in response to determination the link strength for the cluster of the second plurality of clusters relative to a cluster of the first plurality of clusters being weak and/or a merged functional form for the cluster of the second plurality of clusters in response to the determination that the link strength for the cluster of the second plurality of clusters relative to a cluster of the first plurality of clusters being strong. The functional form of the cluster of the second plurality of clusters may be indicative of property of the cluster and the merged functional form is a functional form corresponding to a merged cluster obtained by merging of the cluster of the second plurality of clusters with the cluster of the first plurality of clusters. The merged functional form is indicative of property of the merged cluster.

The non-transitory computer-readable medium 802 includes instructions 830 to identify if a data point of the second plurality of data points is an anomaly based on the deriving of the at least one of the functional form and the merged functional form. The non-transitory computer-readable medium 802 includes instructions 832 to generate, in response to the identification, a signal corresponding to the data point, the signal indicating that the data point is an anomaly.

The non-transitory computer-readable medium 802 includes instructions to derive a functional form for each of the first plurality of clusters and at least one of: the functional form of a cluster of the second plurality of clusters and a merged functional form for the cluster of the second plurality of clusters using one of: a regression model, a decision tree model, a random forest model, and an Artificial Neural Network model.

The non-transitory computer-readable medium 802 includes instructions to compute a rate of expansion for each of the first plurality of clusters that are not part of the merged cluster, each of the second plurality of clusters that are not part of the merged cluster, and the merged cluster and determine a saturation point for the functional form for each of the first of clusters that are not part of the merged cluster, each of the second plurality of clusters that are not part of the merged cluster, and the merged cluster based on the rate of expansion. The non-transitory computer-readable medium 802 includes instructions to receive an additional data point. The non-transitory computer-readable medium 802 includes instructions to identify if the additional data point is an anomaly based on the determined functional forms and based on the corresponding saturation points.

The non-transitory computer-readable medium 802 includes instructions to ascertain if the second plurality of data points are lesser than a threshold number of data points based on the comparison and detect a margin of error between each data point of the second plurality of data points from a functional form of each of the first plurality of clusters based on the ascertaining that the second plurality of data points is lesser than the threshold number of data points. Further, the functional form of the cluster of the second plurality of clusters may be indicative of property of the cluster. The non-transitory computer-readable medium 802 includes instructions to identify if each data point of the second plurality of data points is an anomaly based on the detected margin of error for each data point of the second plurality of data points relative to the functional form of each of the first plurality of clusters.

The present subject matter accurately detects the anomalies in data. The present subject matter enables classifying the data point as an anomaly per the functional form existing in a multi-dimensional space. With the use of the present subject matter, complex and non-linear relationships between variables in a multi-dimensional space may be identified and represented. Further, in the present subject matter, clusters are dynamically updated as new data patterns evolve. Accordingly, the present subject matter eliminates detection of false positives or false negatives corresponding to identification of anomaly in data and thereby, increasing the accuracy of detection of anomalies. Since the present subject matter uses functional forms for anomaly prediction, the present subject matter can be in forecasting a time series and removing the anomalies with proper substitute points to make the forecast precise. Further, since the present subject matter captures all possible functional forms in the data and identifies the anomaly in advance, classification of data at a future point of time is also possible. For example, if any data point at a current time is assumed an anomaly. As per future projection, the data point may not be an anomaly. The present subject matter enables accurately determining the future projection. Therefore, the present subject matter helps understanding the patterns in data in advance.

EXAMPLES

Figure 9D:
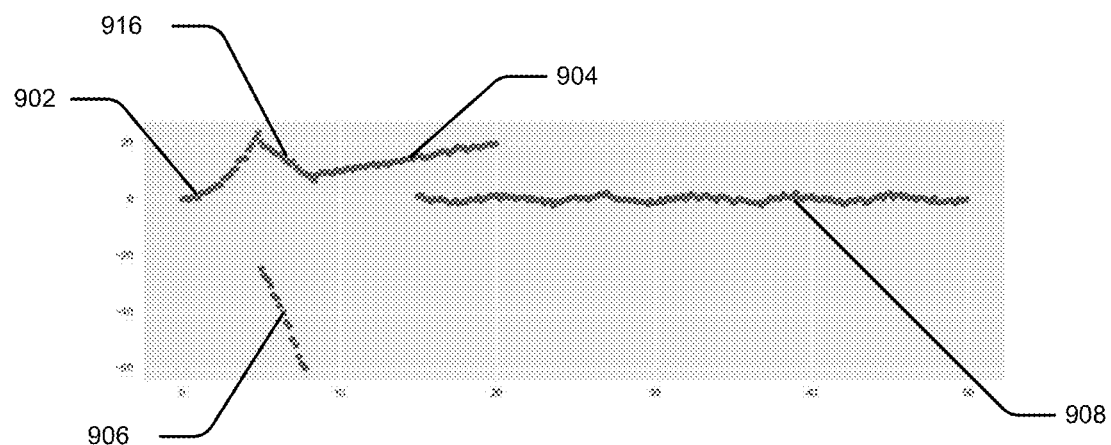
FIG. 9d illustrates an example of merging of clusters and functional forms, in accordance with example implementation of present subject matter.
Figure 9E:
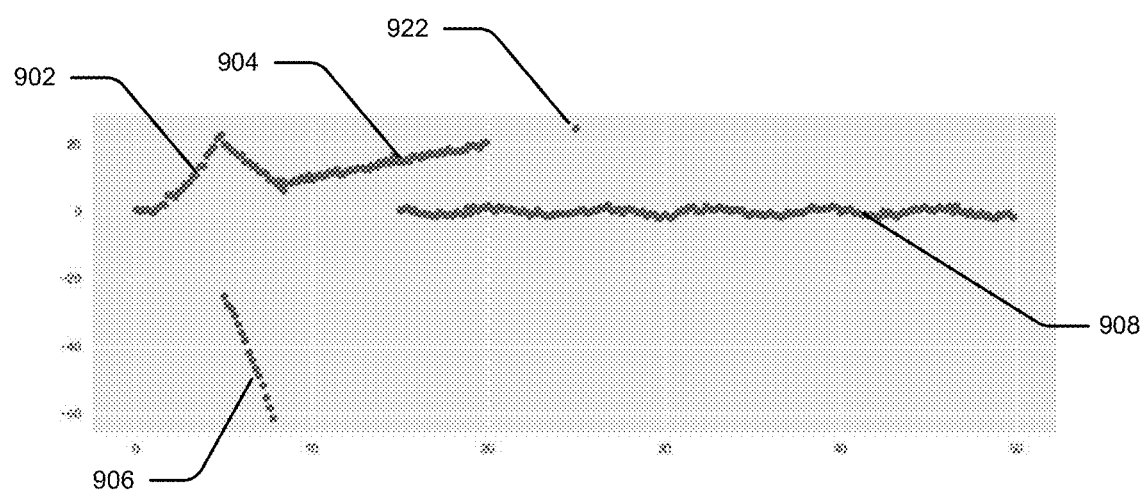
FIG. 9e illustrates an example of detection of anomaly of an additional data point, in accordance with example implementation of present subject matter.

FIG. 9a illustrates an example of densely connected clusters, in accordance with example implementation of present subject matter. FIG. 9b illustrates an example table of different frequencies obtained for different pair of values of Epsilon (ε), min_samples, cluster count, and prediction variance, in accordance with example implementation of present subject matter. FIG. 9c illustrates an example of additional data points obtained along with the densely connected clusters, in accordance with example implementation of present subject matter. FIG. 9d illustrates an example of merging of clusters and functional forms, in accordance with example implementation of present subject matter. FIG. 9e illustrates an example of detection of anomaly of an additional data point, in accordance with example implementation of present subject matter. For the sake of brevity, FIGS. 9a-9e are explained in conjunction with each other.

As an example, 2-dimensional data points are considered for the sake of simplicity. Referring to FIG. 9a, with the approach to identify the densely connected clusters from the obtained data points, four clusters, such as 902, 904, 906, and 908 were identified. The four clusters were obtained from modal frequency value, which corresponds to 4 only. The frequencies were obtained (as depicted in FIG. 9b) as per different pair of values for parameters, such as ε of neighbourhood around a data point and a minimum number of neighbouring data points within the predetermined radius (min_samples) for DBSCAN parameters. Hence, mostly 4 clusters were formed. Further, it also satisfies all conditions in order to be optimal number of data points (opt_k). Hence opt_k is identified as 4.

Now for each cluster 902, 904, 906, and 908, a functional form indicative of the property of the cluster was created using the first model, such as a machine Learning model. The functional form captures the nonlinearity of the data. The anomalous nature in additional data points 914, referred to as anom_pts, such as [(1, 20), (5, 0), (10, 10)], were obtained. Referring to FIG. 9c, the additional data point (10, 10) is the only data point which lies in area corresponding to the 3rd cluster 904. Other additional data points 914 do not lie in any of the area corresponding to any of the clusters 902, 904, 906, 908. Hence, they are outliers or anomalies. The additional Point 914 ((1, 20)) is an extreme anomaly as it does not follow any functional form. Further, the additional point 914 ((5, 0)) lies between areas corresponding to the clusters 902 and 904.

For the clusters, 902 and 904, if we have had only one functional form instead of two functional forms, then the additional point ((5, 0)) 914 would not have been an anomaly, as that single function might lose information and convolution might happen between extreme point of cluster 902 and the cluster 904. Accordingly, anomaly may not have been detected accurately. With the present subject matter, with different clusters, cluster 902 and 904, a separate functional form for the cluster 902 and a separate functional form for the cluster 904, the additional data point ((5, 0)) 914 can be easily identified as an anomaly as it is far away from the cluster 902 and from the cluster 904. The additional data point ((5,0)) 914 is easily identified as an anomaly with the present subject matter as the additional data point 914 has non-functional relation with existing functional forms of the clusters 902, 904, 906, and 908. Also, per conventional techniques, this additional point ((5,0)) 914 could not have been declared an anomaly as it lies between area corresponding to the cluster 902 and area corresponding to the cluster 904.

Considering another data point ((5, 7)) 914, the data point lies in an area corresponding to the cluster 902. However, the data point 914 does not satisfy the functional form. Therefore, the data point ((5,7)) 914 is an outlier as the data point also does not lie within the edge of an area corresponding to cluster C1. The visualization of additional data points are provided in FIG. 9c.

In an example, the functional forms may be merged. An example with such merged functional forms is depicted in FIG. 9d. Referring to region corresponding to a data point (8, 8), densely connected data points connected to the cluster 904 are depicted. However, in a specific region, the data points connected are not smooth, hence a new functional form will be created which can be seen in area from x=5 to 8 and y=20, 8. Referring to another new densely connected data points, in area from x=15 to 20 and y=15 to 20, they are densely connected and joined in a specific region with the cluster 904 is smooth and hence it will get merged with the cluster 904. Therefore, there are 5 densely connected data points (5 densely connected data clusters). Accordingly, 5 different functional forms are there with each functional form corresponding to a cluster.

For any point p, clusters 902 and 904 (also represented as C1 and C2 respectively), and their corresponding functional forms f(c1), and f(c2) and a single functional form f( ) for a merged cluster which is C1 U C2, p is bounded by region R=Min{C1, C2} to Max {C1, C2}. In other words, extreme values from both the clusters. Then P is an outlier as per f(C1) and f(C2) but a normal point with retaining functional form f( ). Since P is bounded, for any point x1 and x2 which are extreme for C1 and C2, x1 with max(C1) and x2 with min(C2), then max(C1)<p<min(C2). The functional form assumes an average values of y for p as trained from C. Now, as P already lies in the clusters 902, 904, prediction variance in y will increase because uncertainty in splitting the regions for training where max(C1) and min(C2) might be considered in same region. In other words, max(C1), min(C2) E N_R, where N_R is the nodal region of the functional form. Again, if points are (max(C1), y1) and (max(C2), y2), then in N_R, the expected value of the model v satisfies, $$y1<v<y2,$$

as the average value in the nodal region will have other data points y(i) in nbd of y1 and y(j) with cardinality k1 and in nbd of y2 with cardinality k2. Therefore, the functional form prediction in N_R (v)=($\Sigma$y(i)+$\Sigma$y(j))/(k1+k2) as y1>max {y(i); I in {1, 2, . . . , k1}} and y2<min(y(j); j in {1, 2, 3, . . . , k2}}.

Therefore, y1<v<y2. Though conventional techniques can identify this point as an anomaly, but conventional techniques fails to say whether this point is normal or not. The conventional techniques use the pre-determined radius and min_sample criteria to find an anomalous point. However, conventional techniques uses additional parameters to find whether a point is anomalous or not. y is a normal point as per functional form f( ). However, y being a normal point may not be true for f(C1) and f(C2), as it neither lies in C1 and C2 subspaces, nor satisfy both the functional forms. Therefore, y is an anomaly.

Further, as explained earlier, there are chances of expansion in densely connected data points and also a merger of functional forms, the rate of expansion of a given densely connected data points is computed. For a densely connected cluster with a functional form, a rate of expansion in a densely connected manner can be computed. Similarly, saturation point can be calculated based on the rate of expansion. However, the saturation can be calculated only after a second plurality of data points are obtained. The saturation point will also be used for anomaly identification.

Referring to FIG. 9c again, 4 densely connected clusters are depicted. Assuming another set of data points are received. Accordingly, in the subsequent iteration, as is depicted in FIG. 9d, the region of the cluster 904 is expanded from x=15 to y=15 till x=20 and y=20 due to merging of clusters and their functional forms. The rate of expansion in this scenario is identified as (5, 5). With the rate of expansion, saturation point can be determined. For instance, a simple calculation for saturation point is saturation in x=20/(1−0.5)=40 and saturation in y=20/(1−0.5)=40. Therefore, the cluster 904 is expanded from (8, 8) to (40, 40). A data point ((25, 25)) 922 is received $3^{rd}$ or subsequent data batch, as is shown in FIG. 9e. To determine the data point 922 is an anomaly, the saturation point will be used. Based on the saturation point that was computed, the data point ((25, 25)) 914 will not be identified as an anomaly as the data point (25, 25) is bounded by saturation point (40, 40). Any data point whether the data point in a densely connected cluster or outside a densely connected cluster, but in a region corresponding to the densely connected cluster, and follows the functional form of a densely connected cluster, the data point will not be an anomaly since the data point is predicted to be a normal point per rate of expansion and saturation point. The rate of expansion may be dynamic in nature, and hence the region corresponding to each cluster after each obtaining of new data points might be of varying nature as well.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A system for anomaly detection in data, the system comprising
a processing unit to:
receive a first data comprising a first plurality of data points;
identify, using a first model, data points from the first plurality of data points that are connected to each other;
form, using the first model, a first plurality of clusters based on the identification of data points from the first plurality of data points that are connected to each other, wherein each of the first plurality of clusters correspond to the data points of the first plurality of data points that are connected with each other;
determine a functional form for each of the first plurality of clusters in response to the forming of the first plurality of clusters, wherein the functional form of a cluster is indicative of property of the cluster;
receive a second data comprising a second plurality of data points, wherein an anomaly in the second data is to be detected;
compare the second plurality of data points with a threshold number of data points;
detect a margin of error for each data point of the second plurality of data points corresponding to the functional forms of each of the first plurality of clusters based on ascertaining that the second plurality of data points is less than the threshold number of data points;
determine a functional form for each of a second plurality of clusters in response to ascertaining that the second plurality of data points is greater than or equal to the threshold number of data points, wherein each of the second plurality of clusters correspond to data points from the second plurality of data points that are connected to each other, wherein the functional form of a cluster of the second plurality of clusters is indicative of property of the cluster;
identify if a data point of the second plurality of data points is an anomaly based on one of:
the detected margin of error; and
the determined functional forms for the first plurality of clusters and the determined functional forms for the second plurality of clusters; and
generate, in response to the identification that a data point of the second plurality of data points is an anomaly, a signal corresponding to the data point, the signal indicating that the data point is an anomaly.

2. The system as claimed in claim 1, wherein the first model is a Density-Based Spatial Clustering of Applications with Noise (DB-SCAN) model.

3. The system as claimed in claim 1, wherein the functional form of the first plurality of clusters indicates one of: linear relation and a non-linear relationship between at least two variables corresponding to the first plurality of data points and wherein the functional form of the second plurality of clusters indicates one of linear relation and a non-linear relationship between at least two variables corresponding to the second plurality of data points.

4. The system as claimed in claim 1, wherein, prior to determining the functional form for each of a second plurality of clusters, the processing unit is to:

identify, using the first model, the data points from the second plurality of data points connected to each other in response to ascertaining that the second plurality of data points is not less than the threshold number of data points;

form, using the first model, the second plurality of clusters; and determine the functional form for each of the second plurality of clusters in response to the forming the first plurality of clusters.

5. The system as claimed in claim 4, wherein the processing unit is to:

determine a link strength for each of the second plurality of clusters corresponding to each of the second plurality of clusters in response to forming the second plurality of clusters, the link strength being indicative of number of data points of a cluster of the second plurality of clusters that are common with a cluster of the first plurality of clusters; and determine the functional form for each of the second plurality of clusters in response to determining the link strength for each of the second plurality of clusters corresponding to each of the second plurality of clusters.

6. The system as claimed in claim 1, wherein in response to ascertaining that the second plurality of data points are greater than or equal to the threshold number of data points, the processing unit is to:

identify, using the first model, data points from the second plurality of data points that are connected to each other;

form, using the first model, the second plurality of clusters;

determine a link strength for each of the second plurality of clusters corresponding to each of the first plurality of clusters, wherein the link strength is determined based on the number of data points of a cluster of the second plurality of clusters that are common with a cluster of the first plurality of clusters;

form, based on the link strength, a merged cluster by merging a cluster of the second plurality of clusters and a cluster of the first plurality of clusters that have common data points; and determine a merged functional form for the merged cluster in response to the forming of the merged cluster, wherein the merged functional form is indicative of property of the merged cluster.

7. The system as claimed in claim 6, wherein the processing unit is to:

compare that the determined link strength for each of the second plurality of clusters corresponding to each of the first plurality of clusters with a threshold number of common data points;

establish that the link strength of the cluster of the second plurality of clusters corresponding to the cluster of the first plurality of clusters is strong based on the comparison; and form, using the first model, the merged clusters in response to establishing that the link strength is strong.

8. The system as claimed in claim 1, wherein the functional form is determined using one of a regression model, a decision tree model, a random forest model, and an Artificial Neural Network model.

9. The system as claimed in claim 1, wherein the processing unit is to:

compute a rate of expansion of functional form of each of the first plurality of clusters and of each of the second plurality of clusters;

determine a saturation point for the functional forms of each of the first plurality of clusters and of each of the second plurality of clusters based on the rate of expansion;

receive an additional data point; and identify if the additional data point is an anomaly based on the functional forms of each of the first plurality of clusters and each of the second plurality of clusters and corresponding saturation points.

10. A method for anomaly detection in data, the method comprising:

partitioning, using a DB-SCAN model, a first data comprising a first plurality of data points in a multi-dimensional space into a first plurality of clusters, each of the first plurality of clusters includes a subset of the first plurality of data points that are densely connected to each other, wherein the partitioning comprises:

determining an optimal number for the first plurality of clusters;

deriving a functional form for each of the first plurality of clusters, wherein the functional form of a cluster of the first plurality of clusters represents dependencies between at least two variables corresponding to the cluster;

receiving a second data comprising a second plurality of data points;

comparing the second plurality of data points with a threshold number of data points;

partitioning, using the DB-SCAN model, the second plurality of data points in the multi-dimensional space into a second plurality of clusters based on the comparison, each of the second plurality of clusters includes a subset of the second plurality of data points that are densely connected to each other, wherein the partitioning comprises:

determining an optimal number for the second plurality of clusters;

determine a link strength for each of the second plurality of clusters corresponding to each of the first plurality of clusters, the link strength being indicative of number of data points of a cluster of the second plurality of clusters that are common with data points of a cluster of the first plurality of clusters;

deriving a functional form for each of the second plurality of clusters in response to the determination of the link strength, wherein the functional form of a cluster of the second plurality of clusters represents dependencies between at least two variables corresponding to the cluster;

identifying an anomaly in the second plurality of data points upon the deriving of the functional form corresponding to each of the second plurality of clusters; and generating, in response to the identification of a data point of the second plurality of data points as the anomaly, a signal corresponding to the data point, the signal indicating that the data point is an anomaly.

11. The method as claimed in claim 10, comprising:

ascertaining if the second plurality of data points are not less than a threshold number of data points; and partitioning, using the DB-SCAN model, the second plurality of data points in the multi-dimensional space into the second plurality of clusters based on the ascertaining that the second plurality of data points are greater than or equal to the threshold number of data points.

12. The method as claimed in claim 10, comprising:
ascertaining if the second plurality of data points are less than a threshold number of data points based on the comparison;
detecting a margin of error for each data point of the second plurality of data points corresponding to the functional form of each of the first plurality of clusters based on the ascertaining that the second plurality of data points is less than the threshold number of data points; and
identifying if each data point of the second plurality of data points is an anomaly based on the detected margin of error for each data point of the second plurality of data points corresponding to the functional forms of each of the first plurality of clusters.

13. The method as claimed in claim 10, wherein in response to determining the link strength between each of the second plurality of clusters and each of the first plurality of clusters, the method comprises:
comparing the determined link strength for each of the second plurality of clusters corresponding to the first plurality of clusters with a threshold number of common data points;
establish that the link strength of a cluster of the second plurality of clusters corresponding to a cluster of the first plurality of clusters is weak based on the comparison; and
deriving a functional form for each of the second plurality of clusters in response to the establishing that the link strength is weak.

14. The method as claimed in claim 13, wherein determining the link strength for each of the second plurality of clusters corresponding to the first plurality of clusters comprises:
identifying number of common data points that are common between each of the second plurality of clusters, each of the first plurality of clusters, and a hypersphere of a predetermined radius.

15. The method as claimed in claim 10, comprising:
deriving the functional forms for the first plurality of clusters and functional forms for the second plurality of clusters using one of: regression model, a decision tree model, a random forest model, and an Artificial Neural Network model.

16. The method as claimed in claim 10, comprising:
ascertaining that the second plurality of data points are higher than the threshold number of data points;
partitioning, using the DB-SCAN model, the second plurality of data points in the multi-dimensional space into the second plurality of clusters based on the ascertaining that the second plurality of data points are higher than the threshold number of data points;
determining the link strength for each of the second plurality of clusters corresponding to each of the first plurality of clusters;
comparing the determined link strength for each of the second plurality of clusters with a threshold number of common data points;
establishing that the link strength of a cluster of the second plurality of clusters corresponding a cluster of the first plurality of clusters is strong in response to identifying that number of data points of the cluster of the second plurality of clusters that are common with data points of the cluster of the first plurality of clusters is not less than a threshold number of common data points;
forming, using the DB-SCAN model, at least one merged cluster by merging at least one of the first plurality of clusters and at least one of the second plurality of clusters in response to establishing that the link strength is strong;
deriving a merged functional form for the at least one merged cluster, wherein the functional form of the at least one merged cluster represents dependencies between at least two variables corresponding to the at least one merged cluster; and
identifying an anomaly in the second plurality of data points based on the functional form corresponding to each of the first plurality of clusters, functional form corresponding to each of the second plurality of clusters, and functional form of the at least one merged cluster.

17. A non-transitory computer-readable medium comprising instructions for anomaly detection in data, the instructions being executable by a processing resource to:
receive a first data comprising a first plurality of data points;
partition, using a first model, the first data into a first plurality of clusters, each of the first plurality of clusters includes a subset of the first plurality of data points that are densely connected to each other;
derive a functional form for each of the first plurality of clusters, wherein the functional form of a cluster of the first plurality of clusters indicative of property of the cluster;
receive a second data comprising a second plurality of data points;
compare the second plurality of data points with a threshold number of data points;
ascertain that the second plurality of data points is not less than threshold number of data points;
partition, using the first model, the second plurality of data points into a second plurality of clusters in response to ascertaining that the second plurality of data points is not less than the threshold number of data points, each of the second plurality of clusters includes a subset of the second plurality of data points that are densely connected to each other;
determine a link strength for each of the second plurality of clusters corresponding to each of the first plurality of clusters, the link strength being indicative of number of data points of a cluster of the second plurality of clusters that are common with data points of a cluster of the first plurality of clusters;
derive at least one of:
a functional form of a cluster of the second plurality of clusters in response to determination the link strength for the cluster of the second plurality of clusters corresponding to a cluster of the first plurality of clusters being weak, wherein the functional form of the cluster of the second plurality of clusters being indicative of property of the cluster; and
a merged functional form for the cluster of the second plurality of clusters in response to the determination that the link strength for the cluster of the second plurality of clusters corresponding to a cluster of the first plurality of clusters being strong, wherein the merged functional form is a functional form corresponding to a merged cluster obtained by merging of the cluster of the second plurality of clusters with the cluster of the first plurality of clusters, wherein the merged functional form is indicative of property of the merged;

identify if a data point of the second plurality of data points is an anomaly based on the deriving of the at least one of the functional form and the merged functional form; and generate, in response to the identification, a signal corresponding to the data point, the signal indicating that the data point is an anomaly.

18. The non-transitory computer-readable medium of claim 17, the instructions being executable by the processing resource to:

derive a functional form for each of the first plurality of clusters and at least one of: the functional form of a cluster of the second plurality of clusters and a merged functional form for the cluster of the second plurality of clusters using one of: a regression model, a decision tree model, a random forest model, and an Artificial Neural Network model.

19. The non-transitory computer-readable medium of claim 17, the instructions being executable by the processing resource to:

compute a rate of expansion for functional form of each of the first plurality of clusters that is not part of the merged cluster, of each of the second plurality of clusters that is not part of the second plurality of clusters, and the merged cluster;

determine a saturation point for the functional form for each of the first of clusters that is not part of the merged cluster, the second plurality of clusters that is not part of the merged cluster, and the merged clusters based on the corresponding rate of expansion;

receive an additional data point; and identify if the additional data point is an anomaly based on the determined functional forms and based on the corresponding saturation points.

20. The non-transitory computer-readable medium of claim 17, the instructions being executable by the processing resource to:

ascertain if the second plurality of data points are less than a threshold number of data points based on the comparison;

detect a margin of error between each data point of the second plurality of data points from a functional form of each of the first plurality of clusters based on the ascertaining that the second plurality of data points is less than the threshold number of data points; and identify if each data point of the second plurality of data points is an anomaly based on the detected margin of error for each data point of the second plurality of data points corresponding to the functional form of each of the first plurality of clusters.

* * * * *